United States Patent
Endo

(10) Patent No.: US 9,169,632 B2
(45) Date of Patent: Oct. 27, 2015

(54) BUILDING SUPPORT STRUCTURE

(76) Inventor: Tatsuya Endo, Sagamihara (JP)

( * ) Notice: Subject to any disclaimer, the term of this patent is extended or adjusted under 35 U.S.C. 154(b) by 0 days.

(21) Appl. No.: 13/420,841

(22) Filed: Mar. 15, 2012

(65) Prior Publication Data
US 2013/0061536 A1  Mar. 14, 2013

Related U.S. Application Data

(60) Provisional application No. 61/453,555, filed on Mar. 17, 2011.

(30) Foreign Application Priority Data

Jul. 21, 2011 (JP) ................. 2011-159440

(51) Int. Cl.
| | |
|---|---|
| *E04H 15/20* | (2006.01) |
| *E04B 1/34* | (2006.01) |
| *F03D 11/04* | (2006.01) |
| *E04C 3/32* | (2006.01) |
| *E04C 3/36* | (2006.01) |
| *E04H 12/02* | (2006.01) |
| *E04C 3/04* | (2006.01) |

(52) U.S. Cl.
CPC ... *E04B 1/34* (2013.01); *E04C 3/32* (2013.01); *E04C 3/36* (2013.01); *F03D 11/04* (2013.01); *E04C 2003/0495* (2013.01); *E04H 12/02* (2013.01); *Y02B 10/30* (2013.01); *Y02E 10/728* (2013.01)

(58) Field of Classification Search
CPC .... E04H 15/20; E04H 2015/201; E04H 1/169
USPC .......... 52/2.11, 2.13, 2.18, 2.19, 2.21, DIG. 8
See application file for complete search history.

(56) References Cited

U.S. PATENT DOCUMENTS

| | | | | |
|---|---|---|---|---|
| 2,990,836 | A * | 7/1961 | Bird ............................... | 52/2.22 |
| 3,145,853 | A * | 8/1964 | Langenberg ................... | 52/2.11 |
| 4,676,032 | A * | 6/1987 | Jutras ............................. | 52/2.17 |
| 5,311,706 | A * | 5/1994 | Sallee ............................ | 52/2.18 |

(Continued)

FOREIGN PATENT DOCUMENTS

| | | |
|---|---|---|
| JP | 9-137640 A | 5/1997 |
| JP | 10-140882 A | 5/1998 |

(Continued)

OTHER PUBLICATIONS

Palmer, Jason, "The Space Elevator: Going Down?", Nature News, published online May 22, 2006; Nature/ doi:10.1038/news060522-1, 2 pages.

(Continued)

*Primary Examiner* — Elizabeth A Plummer
(74) *Attorney, Agent, or Firm* — Oliff PLC

(57) ABSTRACT

A building support structure has a rigid support body for supporting a building, and a pressurized gas structure provided in the support body. The pressurized gas structure is provided in the support body so as to apply a vertical tension force to the support body. The pressurized gas structure may be a pressure chamber which is provided in the support body, or a saclike membrane. The saclike membrane is connected to the support body under a vertical compression force which is applied by the support body, thereby the saclike membrane applies a vertical tension force to the support body.

21 Claims, 25 Drawing Sheets

(56) References Cited

U.S. PATENT DOCUMENTS

| | | | |
|---|---|---|---|
| 5,527,216 A * | 6/1996 | Senanayake | 454/1 |
| 6,543,730 B2 * | 4/2003 | Pedretti | 248/52 |
| 6,860,069 B2 * | 3/2005 | Morris | 52/2.22 |
| 7,293,412 B2 * | 11/2007 | Fuchs | 60/512 |
| 7,694,486 B2 * | 4/2010 | Murphy et al. | 52/645 |
| 8,245,449 B2 * | 8/2012 | Berdut Teruel | 52/2.11 |
| 2002/0157322 A1 * | 10/2002 | Pedretti | 52/2.13 |
| 2006/0033335 A1 * | 2/2006 | Pedretti | 285/412 |
| 2006/0260209 A1 * | 11/2006 | Pedretti | 52/2.11 |
| 2008/0313969 A1 * | 12/2008 | Colucci et al. | 52/2.18 |
| 2010/0011674 A1 * | 1/2010 | Crettol et al. | 52/2.11 |
| 2010/0163683 A1 * | 7/2010 | Quine | 244/158.5 |
| 2011/0258940 A1 * | 10/2011 | Teruel | 52/2.13 |
| 2012/0131857 A1 * | 5/2012 | Ross-Da Silva | 52/2.18 |

FOREIGN PATENT DOCUMENTS

| | | |
|---|---|---|
| JP | 2001-349098 A | 12/2001 |
| JP | 2004-19322 A | 1/2004 |
| JP | 2010-59761 A | 3/2010 |

OTHER PUBLICATIONS

Ishihara, Fujio and Kaneko, Ryuichi, Excerpt from book "Popular Science Orbit Elevator", published Jul. 25, 1997 by Shokabo Publishing Co. Ltd., Japan, pp. 50 and 51.

* cited by examiner

BUILDING SUPPORT STRUCTURE

CROSS-REFERENCE TO RELATED APPLICATIONS

This application claims the benefit of and priority to U.S. Provisional Patent Application No. 61/453,555 filed on Mar. 17, 2011 and entitled "Pressurized Membrane Structures Composite Structure", and the benefit of and priority to Japanese Patent Application No. 2011-159440 filed on Jul. 21, 2011 and entitled "Pressurized Membrane Composite Structure", and the entire subject matter of each of the aforementioned applications is hereby incorporated herein by reference.

BACKGROUND OF THE INVENTION

The present invention relates to a support structure for supporting a building or the like.

Recently, skyscrapers and high-rise buildings such as Tokyo Sky Tree (height 634 m) in Japan are constructed in many countries around the world. And, construction of much taller buildings is now under contemplation. However, strength of a building support structure must be increased with the height of the building, materials such as steel used for the support structure is considerably increased, resulting in escalating cost of construction. And, when a low height, but very large building such as an arena is constructed, in particular in a snowy region, its support structure must be strong sufficient to bear a lot of snow which piled up on its roof, hence consumption of materials such as steel for the support structure is also considerably increased, also resulting in escalating the cost of construction. Even for general buildings, neither high-rise buildings nor very large buildings, the consumption of the materials such as steel for the support structure must be saved to reduce the cost of construction.

It is an object of the present invention to solve the abovementioned problems, specifically, to provide a building support structure for allowing for constructing a building which has a sufficient strength even though the consumption of the materials such as steel is saved.

SUMMARY OF THE INVENTION

According to the present invention in order to achieve the aforementioned object, there is provided a novel building support structure. The building to support structure comprises a support body having rigidity for supporting the building, a frame or a structure such as truss frame, rigid-frame, monocoque structure and shell structure, and a pressurized gas structure (including a pressurized air structure, namely pneumatic structure) which is provided in the support body. Here, the term "gas" is used to mean a substance as opposed to a solid or liquid, therefore, the "gas" includes an air. The support body having rigidity and the pressurized gas structure construct a complex support structure.

Alternatively, a building support structure according to the present invention comprises a support body having rigidity for supporting a building, the support body including a frame and a structure such as truss frame, rigid-frame, monocoque structure, and shell structure, and a pressurized gas structure which is provided in the support body so as to apply a vertical tension force or vertical tension load to the support body. Here, the vertical tension force is applied to the support body by the pressurized gas structure. Then, this vertical tension force reduces a stress concentration in a vertical direction which is caused on the support body. Therefore, even though consumption of materials such as steel for the support structure is saved, it is ensured that the support structure is provided with sufficient strength.

The pressurized gas structure may be a pressure chamber which is provided or formed inside the support body, for example, is defined by an air-tight internal space of the support body. A vertical tension force or vertical tension load may be applied to the support structure by enveloping a pressurized gas or high pressure gas (at least a gas (including an air) having a pressure higher than atmosphere pressure or a pressure of an ambient air) into the pressure chamber. Or the pressurized gas structure may be a saclike membrane. The pressurized gas or high pressure gas is enveloped into the saclike membrane. The saclike membrane may be connected to the support body under a vertical compression force or vertical compression load applied by the support body, thereby a vertical tension force or vertical tension load is applied to the support body by the saclike membrane. The saclike membrane has, for example, elasticity, or elasticity in a vertical direction.

The saclike membrane may be connected to the support body in such a manner that an upper surface or an upper surface outer circumference of the saclike membrane is connected to an upper surface support portion of the support body, while a lower surface or a lower surface outer circumference of the saclike membrane is connected to a lower surface support portion of the support body. Here, the saclike membrane is connected to the support body so as to be compressed between the upper surface support portion and the lower surface support portion of the support body under the vertical compression force or vertical compression load applied by the upper surface support portion and the lower surface support portion of the support body. The saclike membrane may have a double or triple separated structure. That is, the inside of the saclike membrane may be separated or divided in a radial direction or a vertical direction.

A pressure sensor for detecting an internal pressure of the pressurized gas structure and a pressure controller for adjusting the internal pressure may be provided so that the internal pressure is set at a proper value and is maintained at the proper value in the pressurized gas structure such as the pressure chamber or the saclike membrane. The pressure controller adjusts or controls the internal pressure of the pressurized gas structure based on the pressure value detected by the pressure sensor.

According to one aspect of the present invention, a building support structure comprises a plurality of support structure units, each of the support structure units has a support body unit having rigidity for supporting a building and including, a frame or a structure such as truss frame, rigid-frame, monocoque structure and shell structure, and a pressurized gas structure portion which is provided in the support body unit.

Alternatively, a building support structure according to the present invention comprises a plurality of support structure units, each of the support structure units has a support body unit having rigidity for supporting a building and including a frame or a structure such as truss frame, rigid-frame, monocoque structure and shell structure, and a pressurized gas structure portion which is provided in the support body unit so as to apply a vertical tension force or vertical tension load to the support body unit.

Here, for example, the plurality of the support structure units are arranged sequentially so as to extend in a direction of a height of the support structure unit.

And, a building support structure according to another aspect of the present invention comprises a support body having rigidity for supporting a building and including a frame or a structure such as truss frame, rigid-frame, monocoque structure and shell structure, and a pressurized gas structure which is provided in the support body so as to apply a vertical tension force or vertical tension load to the support body and is sectioned or divided into a plurality of pressurized gas structure portions. Each of the pressurized gas structure portions is adapted to apply a vertical tension force or vertical tension load to the support body. Here, for example, the plurality of the pressurized gas structure portions are arranged sequentially so as to extend in a direction of a height of the support body.

Sectioning or dividing the pressurized gas structure into the plurality of the pressurized gas structure portions provides an effective countermeasure in case that the pressure chamber inside the support body or the support body unit or the saclike membrane as the pressurized gas structure portion is damaged for some reason. In many cases, a higher portion and a lower portion of the building support structure may require different tension forces. Then, when the pressurized gas structure is sectioned or divided into the plurality of the pressurized gas structure portions, the pressurized gas structure portions are arranged sequentially, for example, in a direction of a height of the support body, and an internal pressure of each of the pressurized gas structure portion may be set independently, this arrangement allows for setting the internal pressure of the lower pressurized gas structure portion higher than that of the upper pressurized gas structure portion, or allows for setting the internal pressure of the pressurized gas structure portion in such a manner that the lower the pressurized gas structure portion is positioned, the higher internal pressure the pressurized gas structure portion has. Accordingly, the upper pressurized gas structure portion is prevented from having unnecessary high pressure, thereby, for example, the upper pressurized gas structure portion and related components can be prevented from early deterioration, and weight of materials and related components is reduced by lowering the pressure resistant property of the upper pressurized gas structure portion. Here, for example, the saclike membrane is connected to the support body or the support body unit under a vertical compression force applied by the support body or the support body unit, thereby the saclike membrane applies a vertical tension force to the support body or the support body unit. And, the saclike membrane also may be connected to the support body or the support body unit in such a manner that an upper surface or an upper surface outer circumference of the saclike membrane is connected to an upper surface support portion of the support body or the support body unit, while a lower surface or a lower surface outer circumference of the saclike membrane is connected to a lower surface support portion of the support body or the support body unit. Here, the saclike membrane is connected to the support body or the support body unit so as to be compressed between the upper surface support portion and the lower surface support portion of the support body or the support body unit under the vertical compression force or vertical compression load applied by the upper surface support portion and the lower surface support portion of the support body or the support body unit. The saclike membrane may have a double or triple separated structure. Preferably, the pressurized gas structure portion is provided with a pressure sensor for detecting an internal pressure and a pressure controller for adjusting or controlling the internal pressure.

For the support body and the support body unit, reinforced concrete such as steel framed reinforced concrete, metallic material such as rolled steel, stainless steel plate or strip made of aluminum or aluminum alloy, composite material such as fiber reinforced plastic may be used. And, for the saclike membrane, metal such as mild steel, thermoplastic material and composite material or the like may be used. For the thermoplastic material, polyimide, polyethylene, polypropylene, polyvinyl chloride, polystyrene, polyvinyl acetate, polytetrafluoroethylene (PTFE), acrylonitrile-butadiene-styrene (ABS) resin, acrylonitrile styrene (AS) copolymer, nylon, ester. acrylic resin, rubber or the like may be used.

The building support structure of the present invention may be applied for any kind of buildings such as an ordinary building, a residential building, an ordinary house, a wind power facility, a water storage facility as well as a broadcasting tower and an observation tower.

According to the present invention, the pressurized gas structure assists in improving compressive strength or compression resistance of the support body or the support body unit of the building, and in enhancing strength of the support structure.

DETAILED DESCRIPTION OF THE INVENTION

Figure 1:
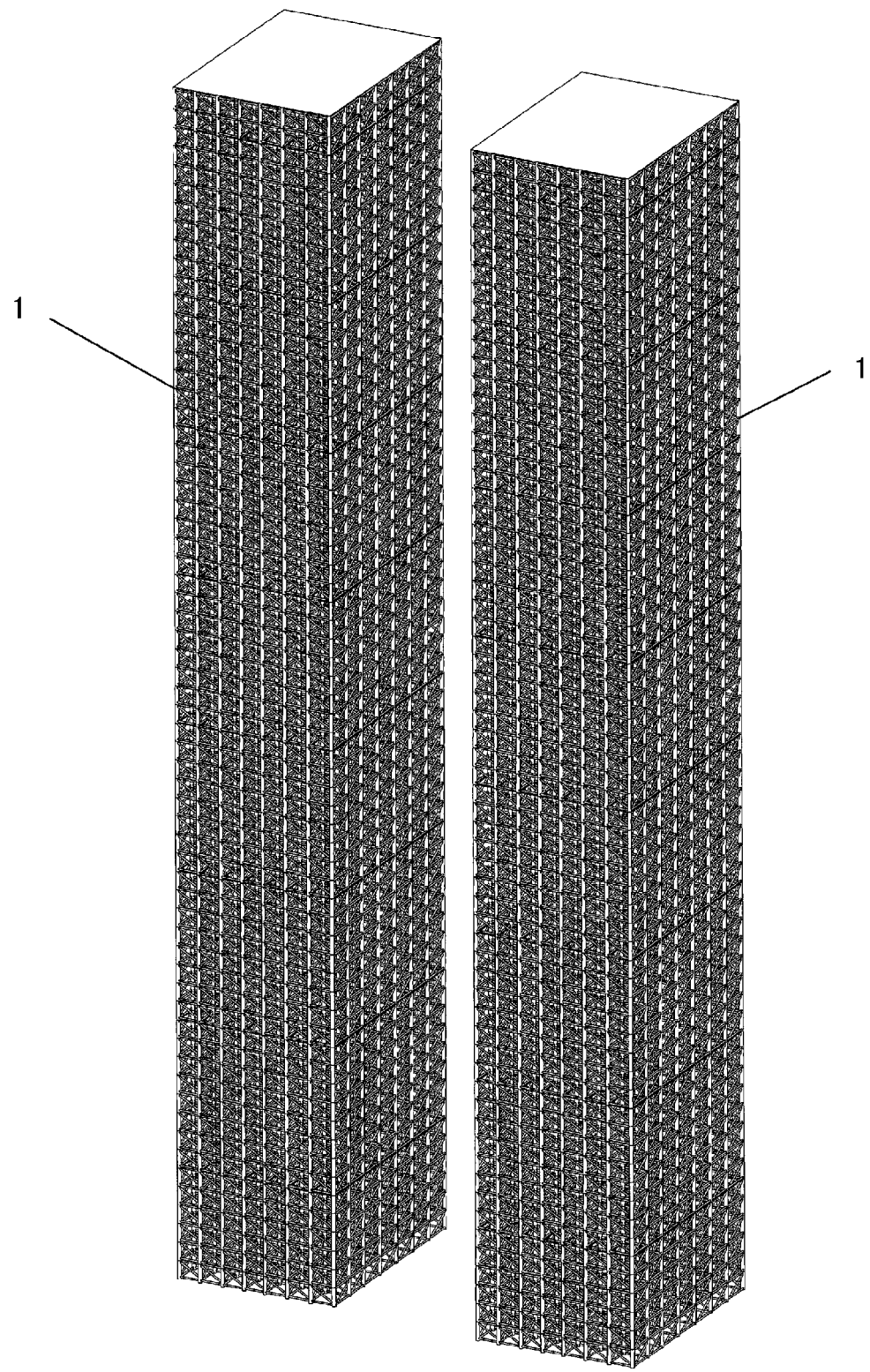
FIG. 1 is a view showing a building in which a support structure of the present invention is used.

FIG. 1 is a view showing a building in which a support structure of the present invention is used. The building 1 shown is a residential building which has a section of a rectangle and extends long in a direction of height. In the building 1, a columnar support structure is constructed.

Figure 2:
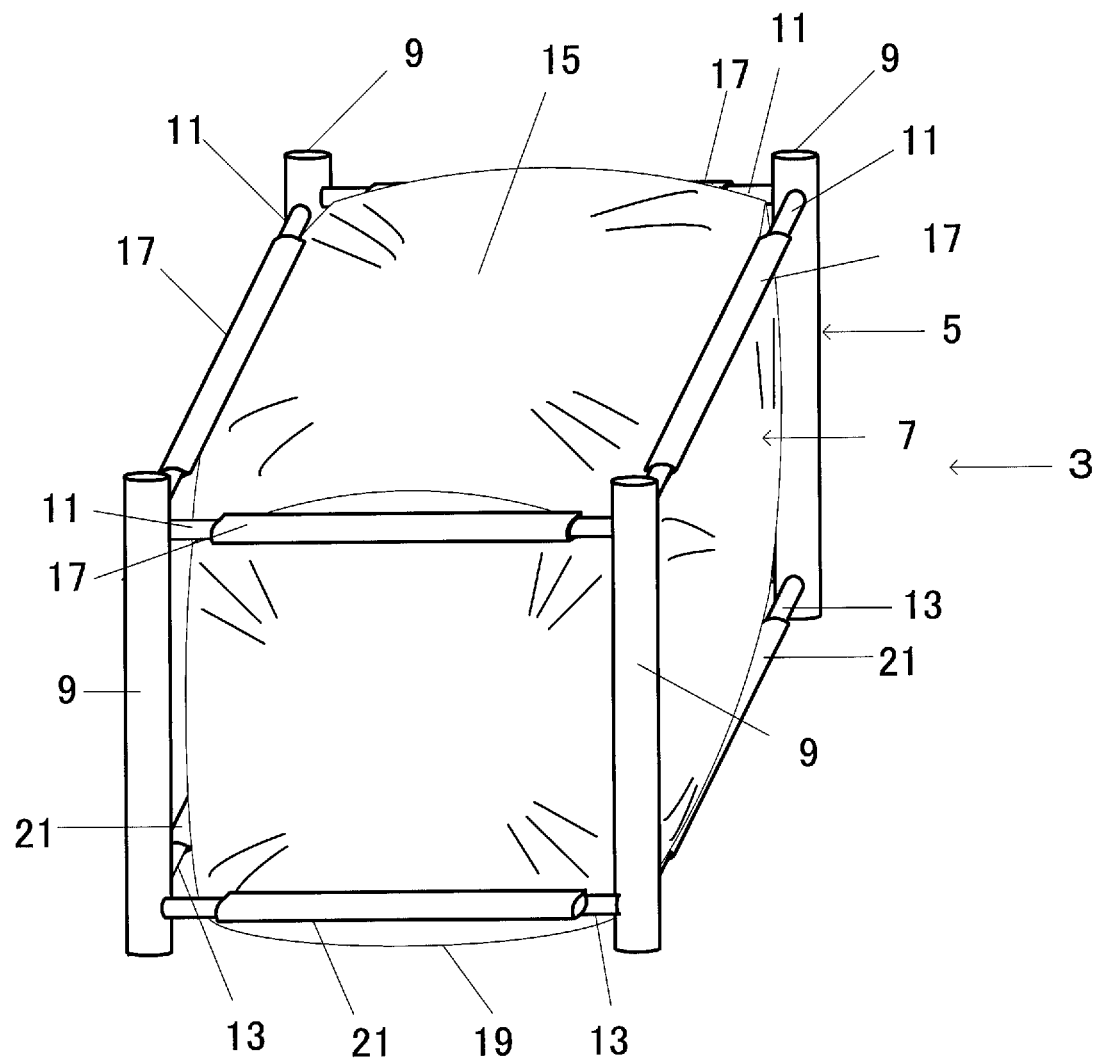
FIG. 2 is a view showing a support structure unit which is used in a columnar support structure of the building.
Figure 3:
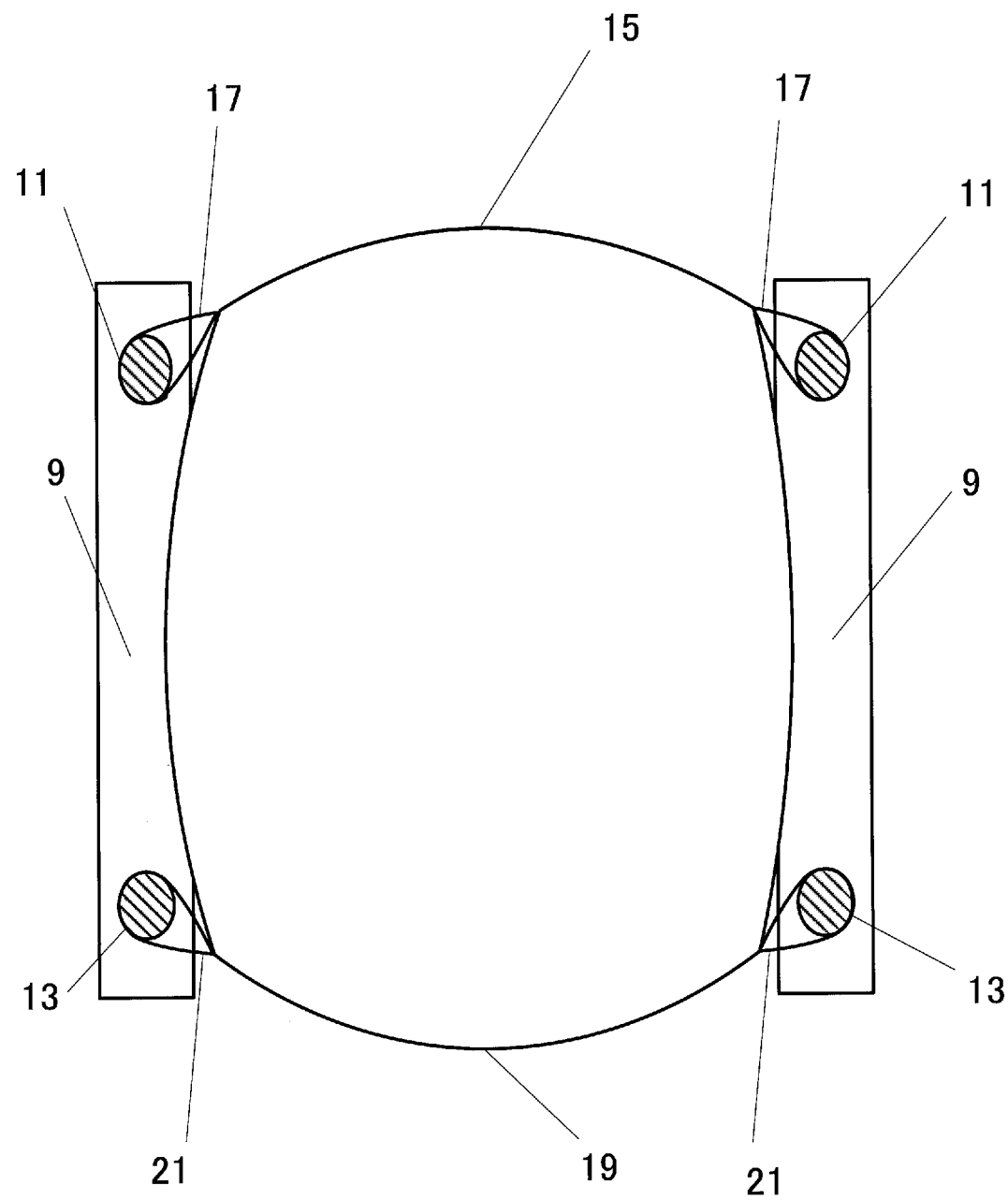
FIG. 3 is a sectional view of the support structure unit.
Figure 4:
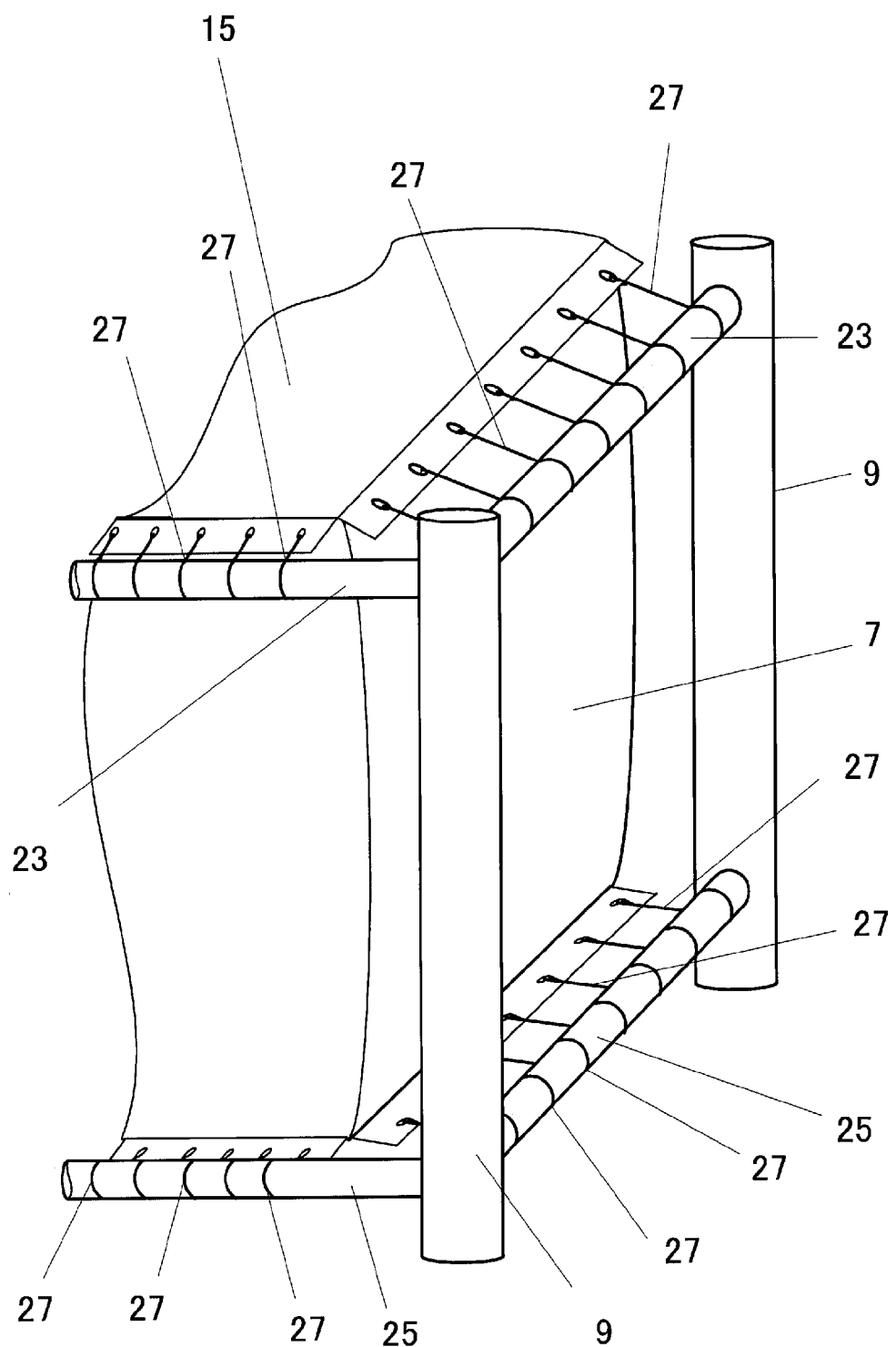
FIG. 4 is a view showing another connecting manner or connecting mode of a saclike membrane.
Figure 5:
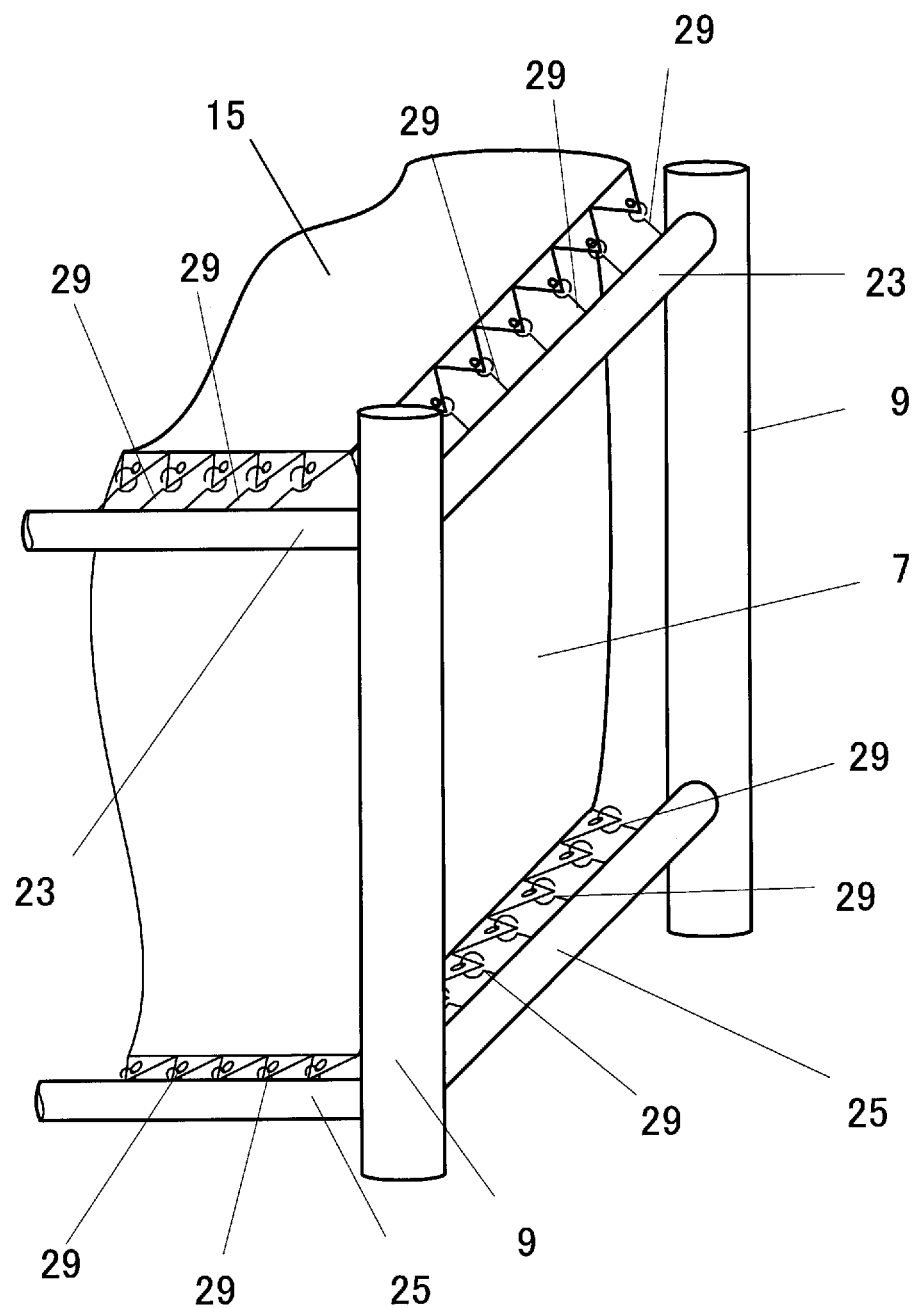
FIG. 5 is a view showing yet another connecting manner or connecting mode of the saclike membrane.

FIG. 2 is a view showing a support structure unit which is used in the columnar support structure of the building 1. The support structure unit 3 comprises a metallic support body unit 5 of rigid-frame, a reinforced plastic saclike membrane 7 which is elastically deformable and is connected to the support body unit 5. The support body unit 5 has four columns 9, four upper beams 11 which connect upper end portions of adjacent columns 9, respectively, and four lower beams 13 which connect lower end portions of adjacent columns 9, respectively. The saclike membrane 7 is in a form of a saclike cuboid shape which is generally identical to a cuboid internal space which is defined by four columns 9, four upper beams 11 and four lower beams 13, a pressurized gas is enveloped in the saclike membrane 7, and the saclike membrane 7 is disposed in the internal space of the support body unit 5. Four upper winding strips 17 are formed on an outer rim portion of the upper surface 15 of the saclike membrane 7, while four lower winding strips 21 are formed on an outer rim portion of the lower surface 19 of the saclike membrane 7. As shown in FIG. 3, the saclike membrane 7 is connected to the support body unit 5 with the upper winding strip 17 fixedly wound around the upper beam 11 (an upper surface support portion) and the lower winding strip 21 fixedly wound around the lower beam 13 (a lower surface support portion). For example, an adhesive is used for fixing the upper winding strip 17 onto the upper beam 11 and the lower winding strip 21 onto the lower beam 13. The saclike membrane 7 is restrained from expanding upwardly and downwardly (vertically) by the upper winding strip 17 and the lower winding strip 21 and is compressed upwardly and downwardly, and applies an upward and downward tension force to the upper and lower beams 11, 13, therefore to the columns 9. The saclike membrane 7 may be connected to the support body unit 5 in a manner as shown in FIG. 4, where upper connecting members 23 of cylindrical shape are put on the upper beams 11, respectively, and a corresponding outer rim portions of the upper surface 19 of the saclike membrane 7 are tied and connected to the upper connecting members 23 with strings 27, respectively, while lower connecting members 25 of cylindrical shape are put on the lower beams 13, respectively, corresponding outer rim portions of the lower surface 21 are tied and connected to the lower connecting members 25 with the strings 27, respectively. As shown in FIG. 5, hooks 29 may be used for connecting the saclike membrane 7 to the upper and lower connecting members 23, 27. By the way, external wall members may be fixed on the support body unit 5 for protection of the saclike membrane 7.

Figure 6:
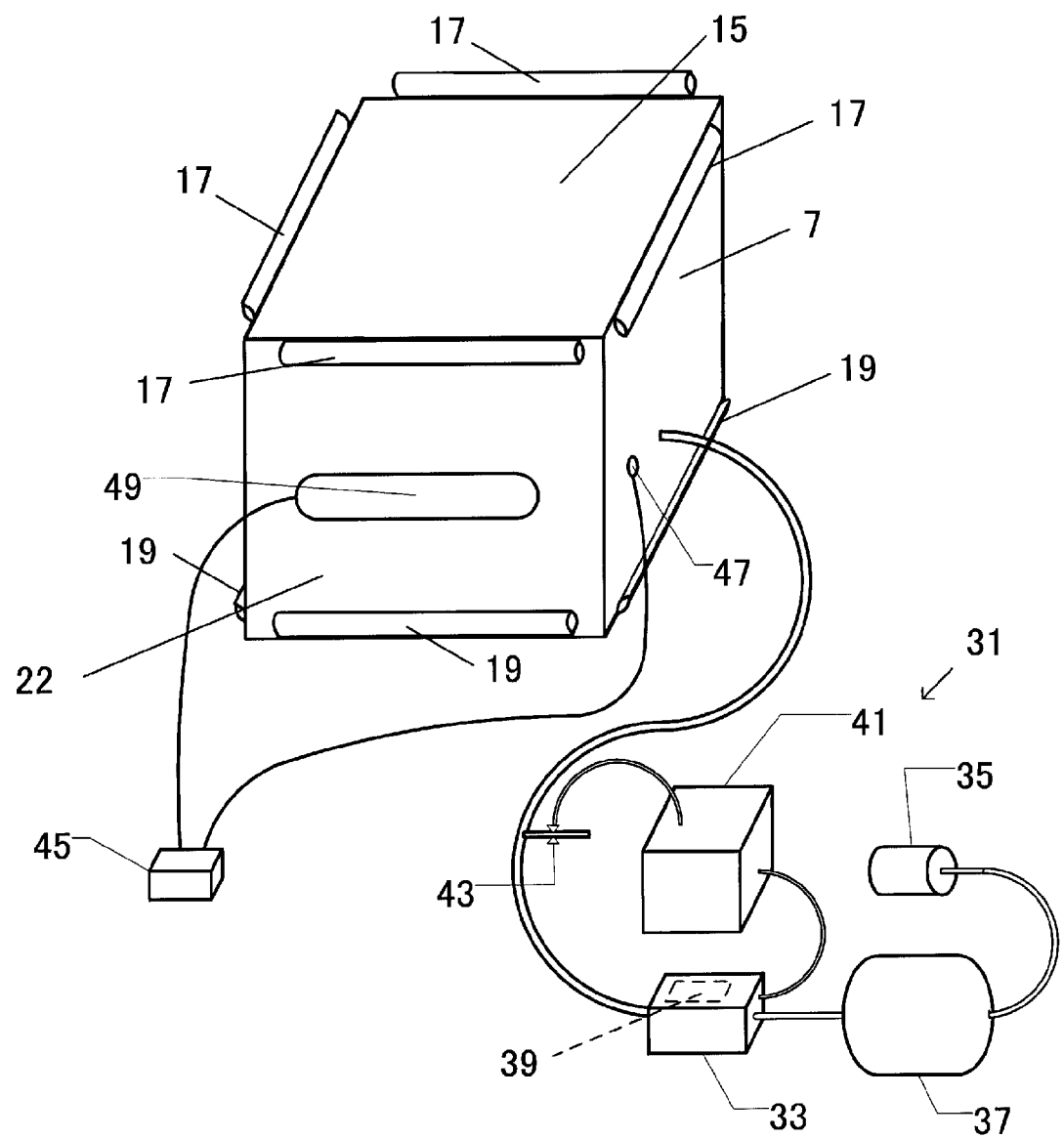
FIG. 6 is a view showing an internal pressure control device which is to be connected the saclike membrane.

FIG. 6 is a view showing an internal pressure control device 31 to be connected to the saclike membrane 7.

Each of the saclike membranes 7 is provided with the internal pressure control device 31. The internal pressure control device 31 comprises an air tank 37 having an air pump 35, a pressure controller 41 and an air release valve (exhaust valve) 43 which is connected to the saclike membrane 7. The air tank 37 is connected to the saclike membrane 7 via an air inlet valve 33, and the pressure controller 41 controls the air inlet valve 33 including a built-in pressure sensor 39 for detecting an internal pressure of the saclike membrane 7. Here, the pressure inside the saclike membrane 7 is controlled in the following manner. Pressure is applied in the air tank 37 by actuating the air pump 35. The pressure sensor 39 detects a pressure in the saclike membrane 7 which is lower than a predetermined pressure (for example, 0.08 mPa), the pressure controller 41 opens the air inlet valve 33 and an air is supplied into the saclike membrane 7 from the air tank 37. And, when the pressure sensor 39 detects the pressure in the saclike membrane 7 which reaches the predetermined pressure (for example 0.1 mPa), the pressure controller 41 closes the air inlet valve 33, and when the pressure in the saclike membrane 7 exceeds the predetermined pressure (for example 0.1 mPa), an air is released from the saclike membrane 7 via the air release valve 43. The air tank 37 with the air pump 35 may be shared by a plurality of the saclike membranes 7. The air pump 35 may be an air compressor. Here, the air release valve 43 is controlled so that the air release valve 43 is automatically open or is closed by the pressure controller 41. It is effective to design the pressure controller 41 to be externally adjustable with respect to a set value. In this embodiment, the internal pressures of the saclike membranes 7 are set by individual internal pressure control devises 31 in such a manner that the internal pressure increases sequentially from the upper saclike membrane 7 toward the lower saclike membrane 7. In FIG. 6, the reference numeral 45 indicates a temperature controller for controlling temperature in the saclike membrane 7. The temperature controller 45 controls a heater 49 and heats up an interior of the saclike membrane 7 by feedback regulation based on a temperature which is detected by a temperature sensor 47 for detecting temperature in the saclike membrane 7. Here, when the temperature in the saclike membrane 7 is raised (increased) to a predetermined temperature by the temperature controller 47, in other words, the temperature in the saclike membrane 7 is raised to the temperature higher than ambient temperature by a predetermined temperature, the pressure in the saclike membrane 7 is increased, and the air density in the saclike membrane 7 is decreased, therefore, the saclike membrane 7 is provided with ascending force in the air. That means, support function of the saclike membrane 7 is increased.

Figure 7:
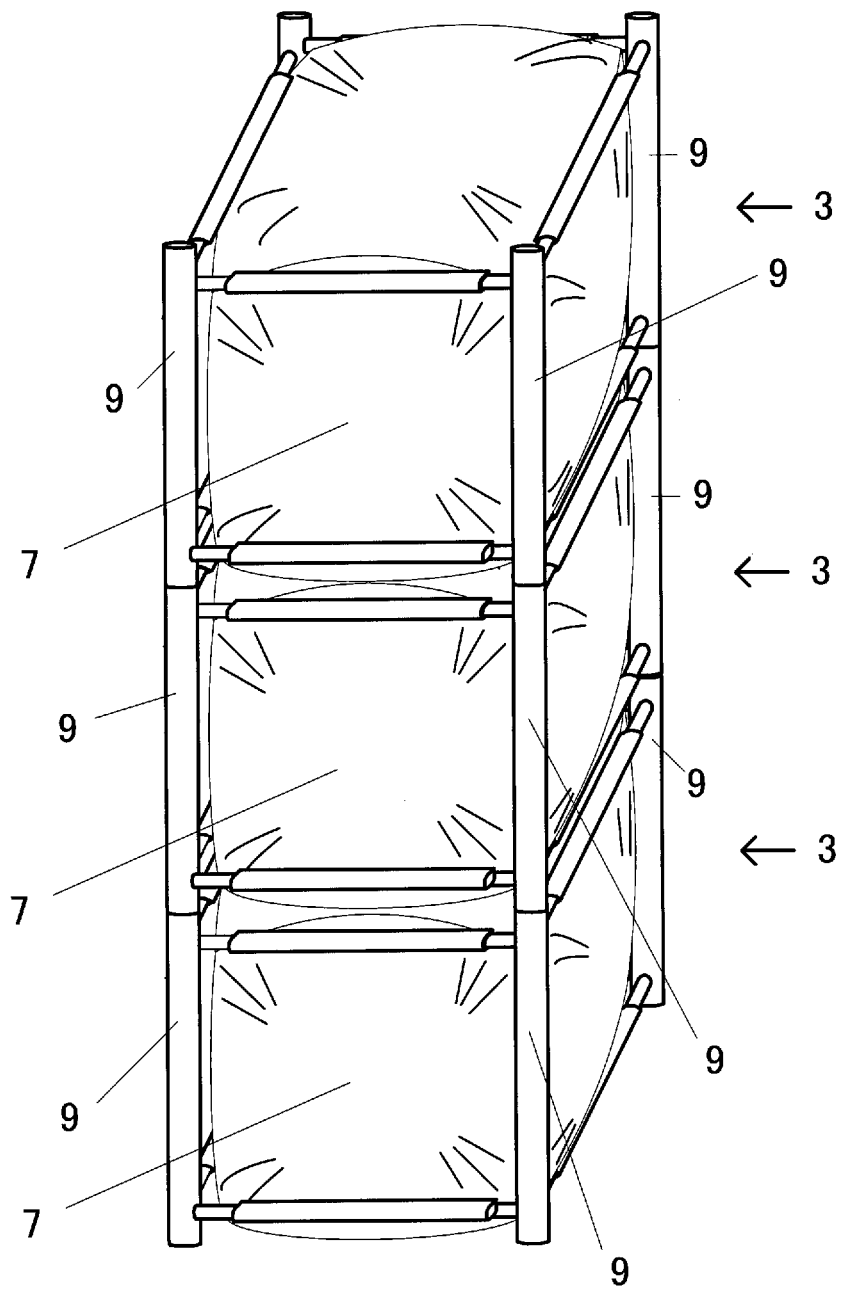
FIG. 7 is a view showing a case where a columnar supporting structure of the building is constructed with use of the support structure units.

FIG. 7 is a view showing the case where a columnar support structure of a building 1 is constructed with use of the support structure unit 3.

Figure 8:
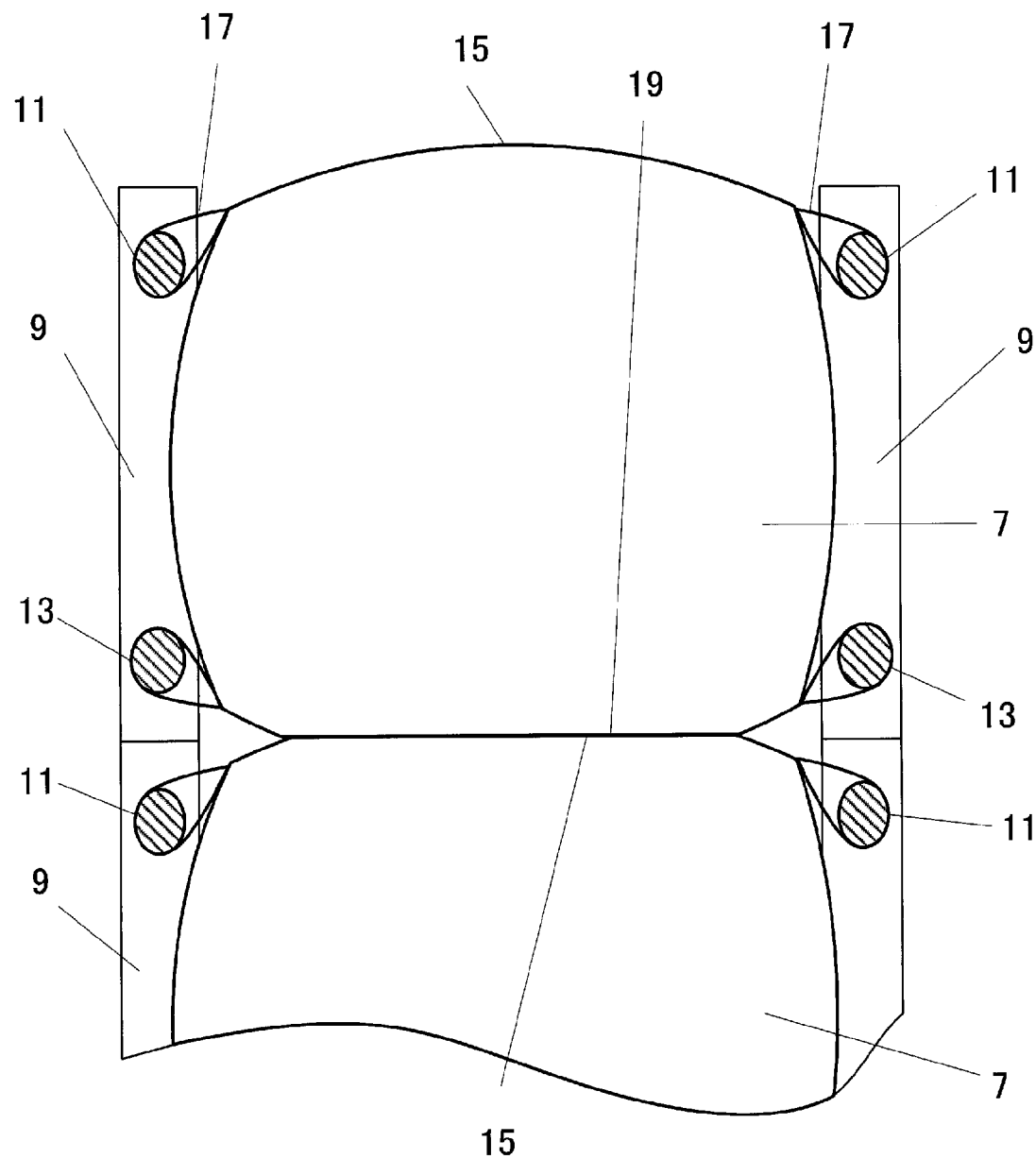
FIG. 8 is a sectional view showing a stack of the support structure units.
Figure 9:
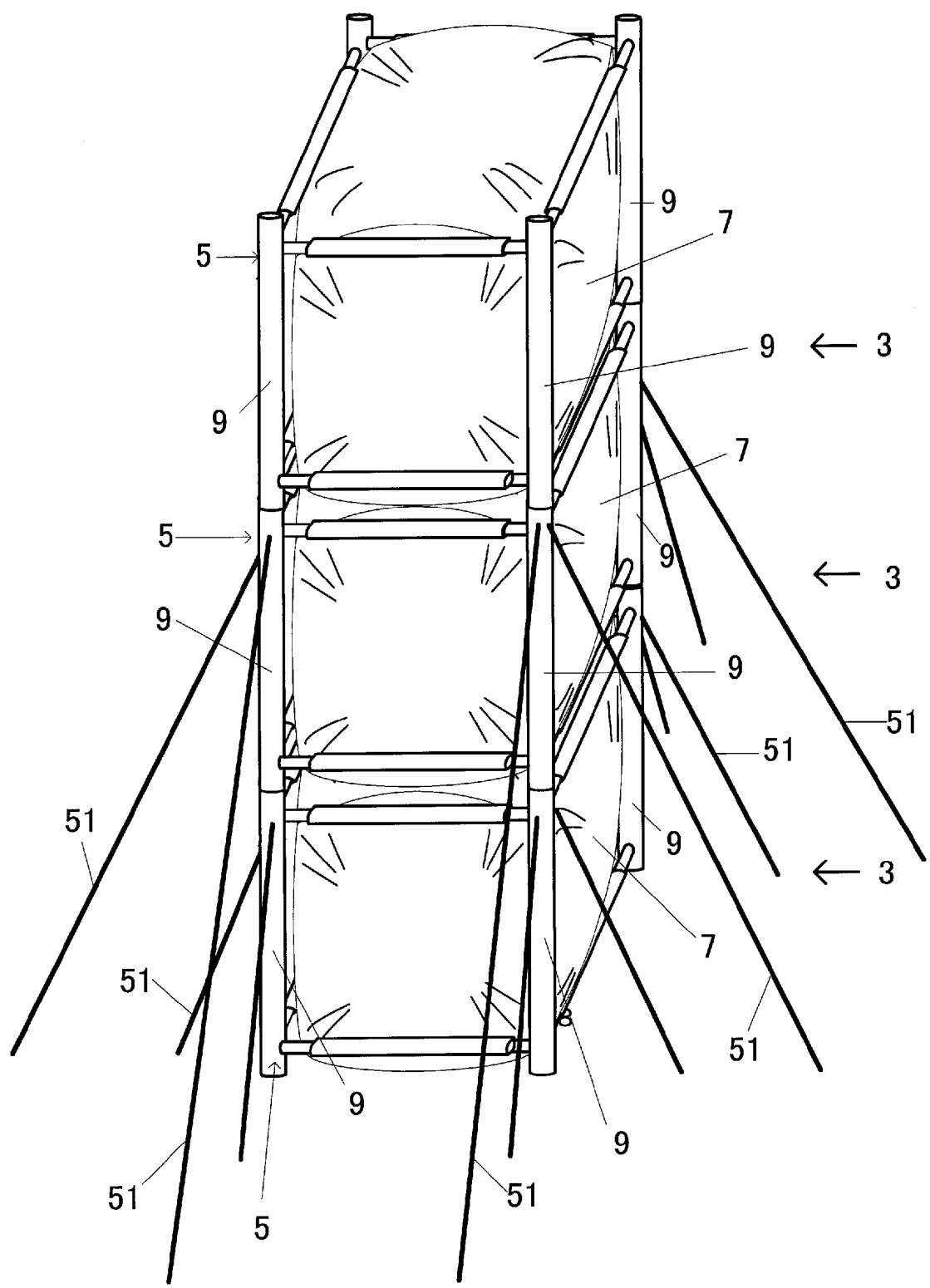
FIG. 9 is a view showing a manner of fixing a lower support structure unit.
Figure 10:
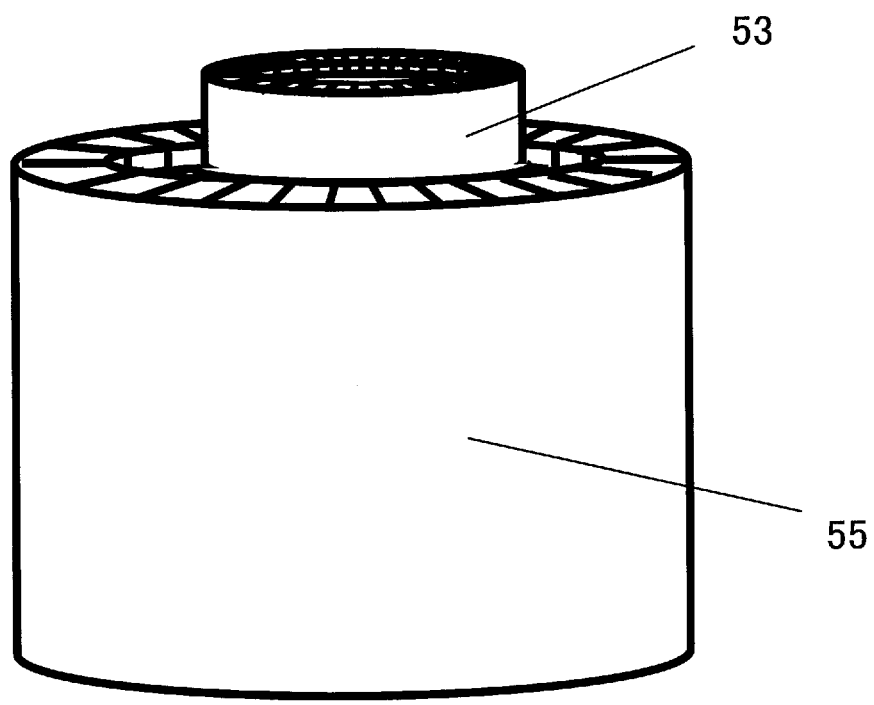
FIG. 10 is a view showing a double columns of inner and outer columns.

The columnar support structure of the building 1 is constructed by stacking vertically and fixing the support structure units 3 one on top of another sequentially. Specifically, lower ends of the columns 9 of one support structure unit 3 are stacked and fixed onto top ends of the columns 9 of another support structure unit 3, and stacking and fixing is repeated (FIG. 7 shows a three-storied construction as an example). The support structure units 3 are stacked in such a manner that the upper surface 15 of the lower saclike membrane 7 and the lower surface 19 of the upper saclike membrane 7 push or abut one another as shown in FIG. 8. Meanwhile, as shown in FIG. 9, bracing wire members 51 for reinforcement may be provided on the columns 9 of the support body unit 5 of the lower support structure units 3. Moreover, as shown in FIG. 10, the columnar support structure may comprise an outer columnar portion 55 and an inner columnar portion 53 which is arranged inside the outer columnar portion 55. The outer columnar portion 55 is constructed by arranging stacks of the support structure units 3 circumferentially, and the inner columnar portion 53 is constructed also by arranging the stacks of the support structure units 3 circumferentially.

Figure 11:
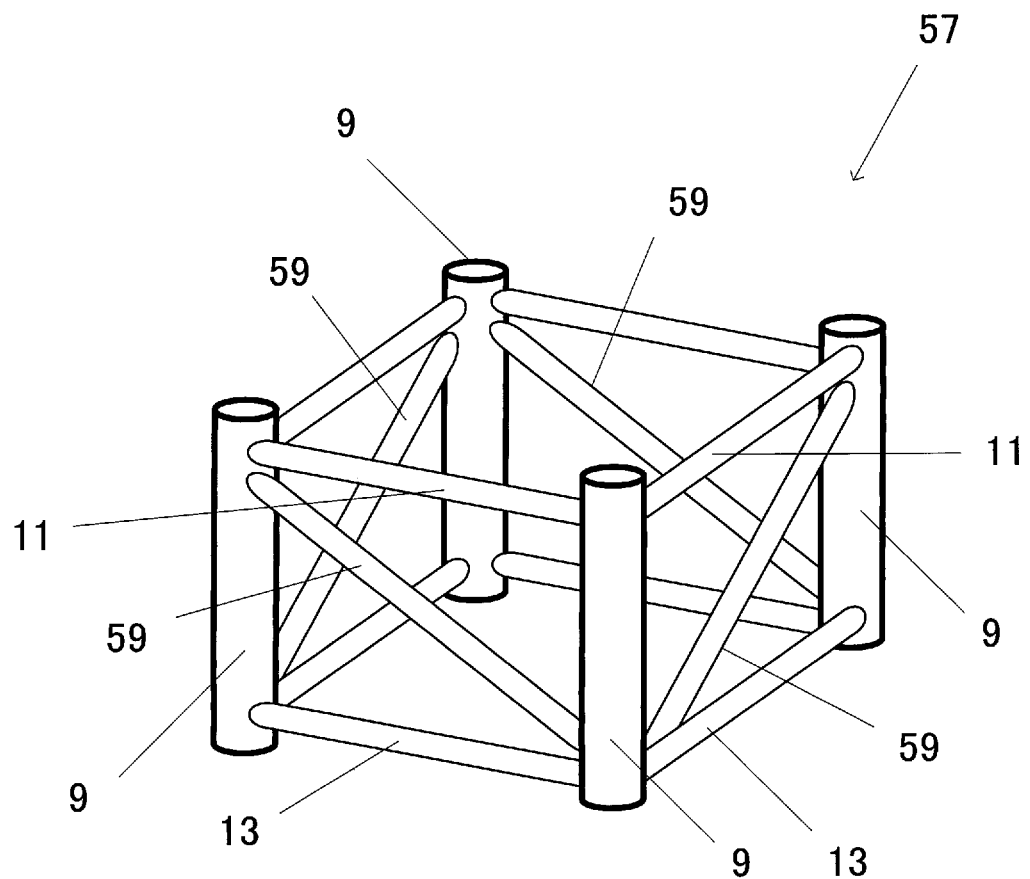
FIG. 11 is a view showing another support structure unit which is used in the columnar support structure of the building.

FIG. 11 is a view showing another support structure unit which is used in the columnar support structure of the building 1.

Figure 12:
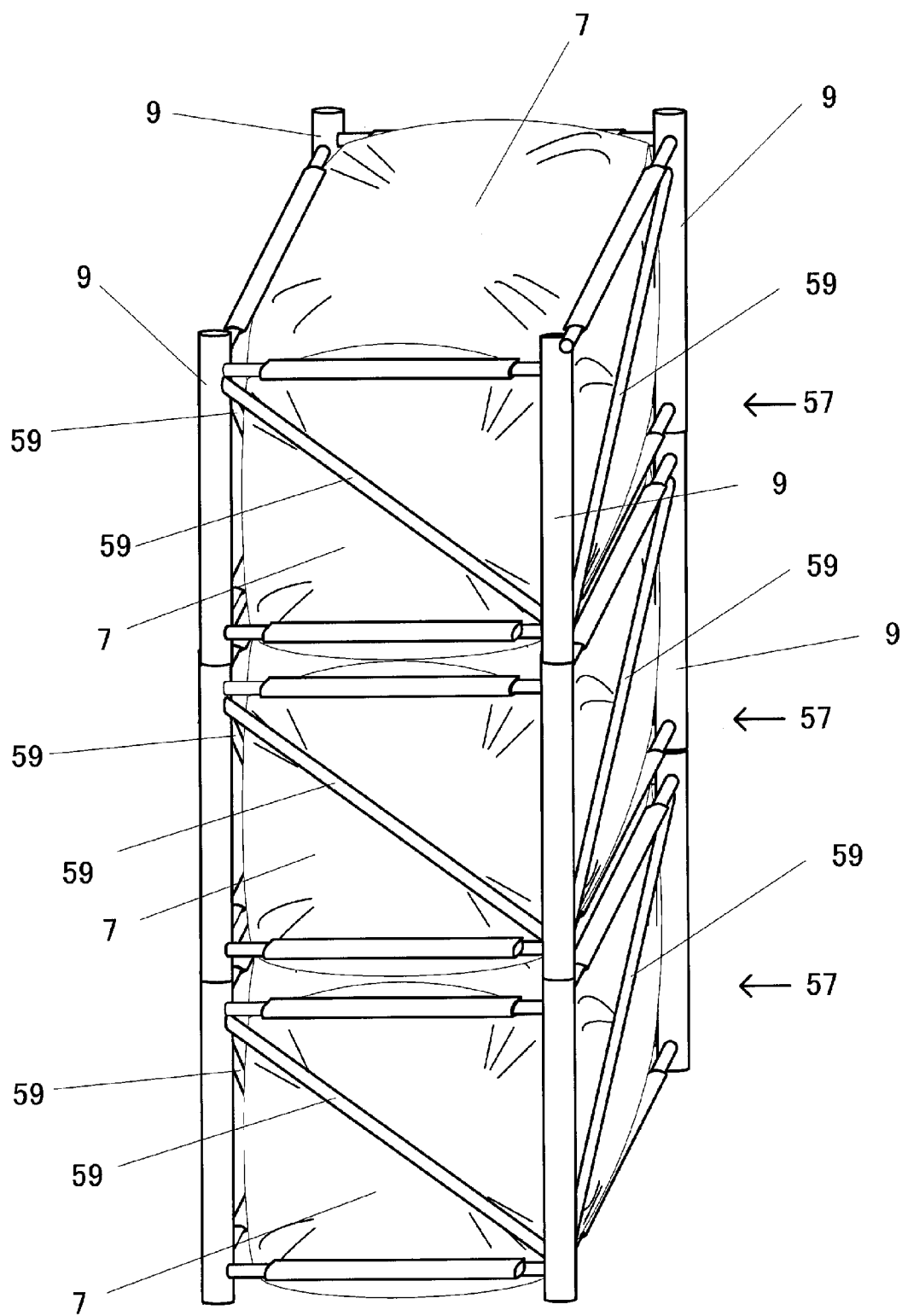
FIG. 12 is a view showing the case that a columnar support structure of the building is constructed with use of the support structure unit of FIG. 11.
Figure 13:
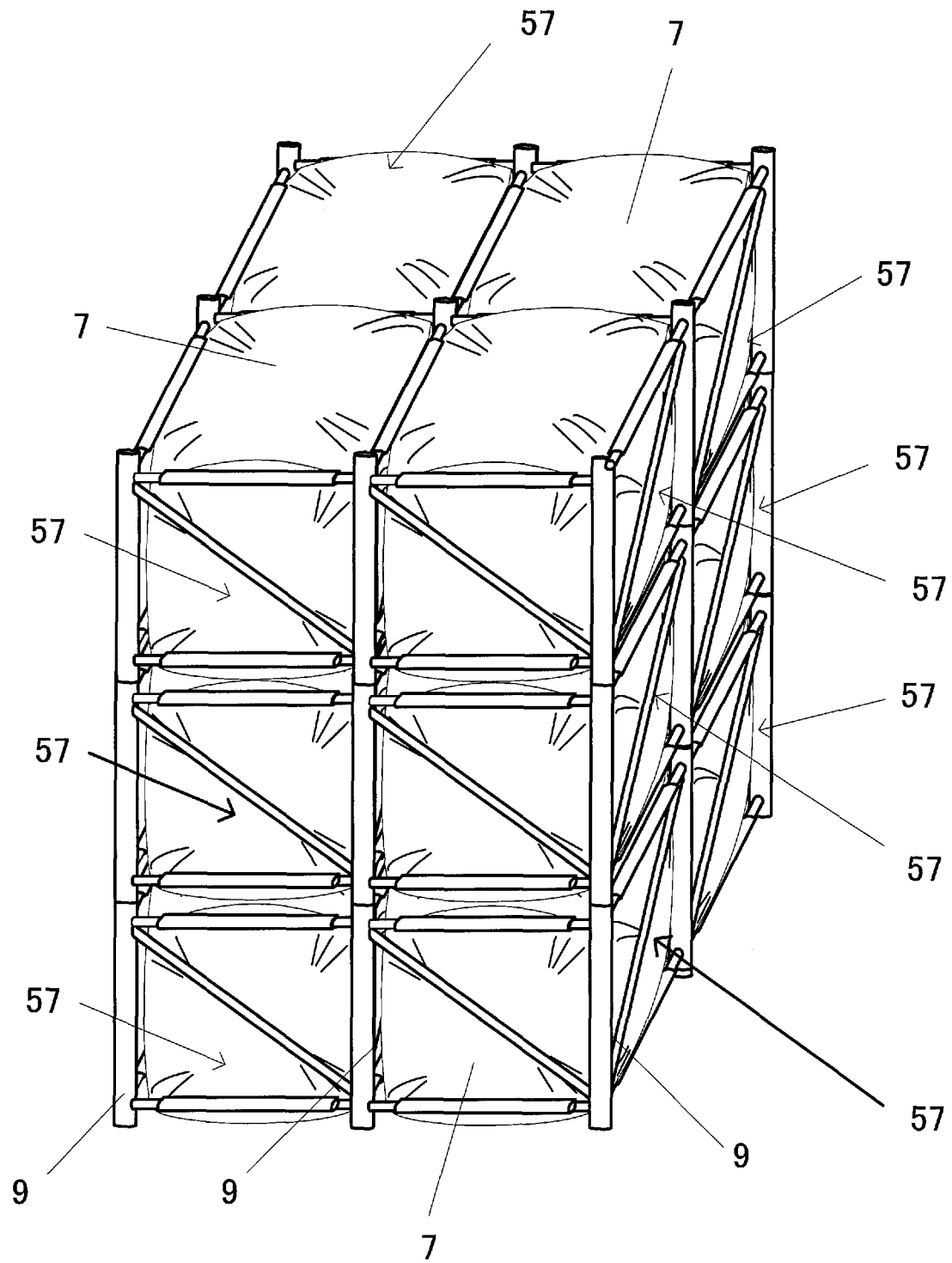
FIG. 13 is a view showing that the support structure units are stacked one on top of another and stacks of the support structure units are placed in a side-by-side relationship.
Figure 14:
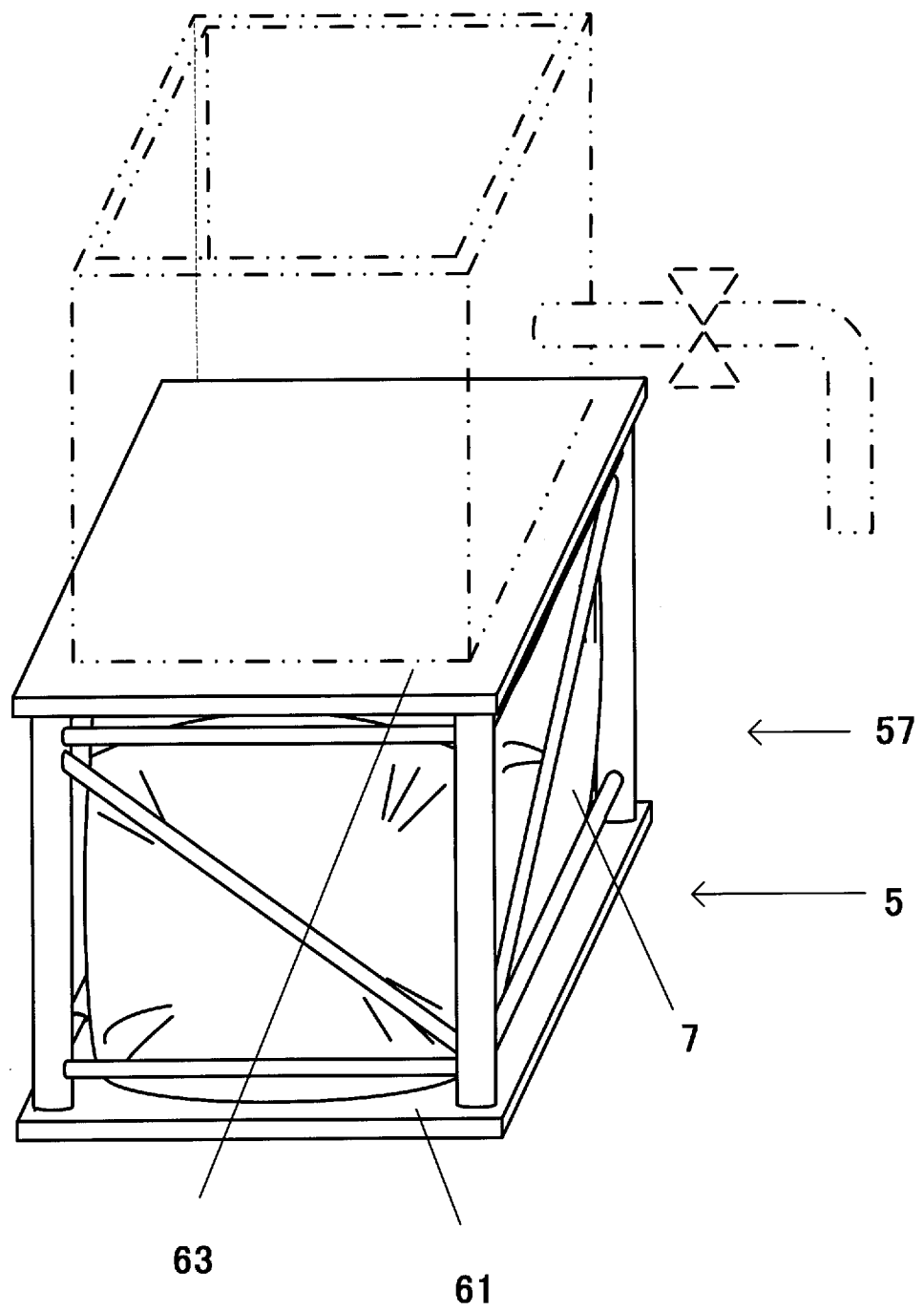
FIG. 14 is a view showing that a support body is provided with a bottom surface portion and a top surface portion.

Another support structure unit 57 is constructed by providing bracings 59 to the support structure unit 3 to modify the metallic support body unit 5 into truss structure or truss frame. Since the support structure unit 57 has otherwise the same configuration as the support structure unit 3, an explanation of identical elements is omitted here. And, as shown in FIG. 12, the columnar support structure of the building 1 may be constructed by vertically stacking the support structure unit 57 on top of another sequentially in the same manner as in the support structure unit 3. Moreover, as shown in FIG. 13, the columnar support structure of the building 1 may be constructed in such a manner that the support structure unit 57 is stacked on top of another in a direction of a height of the support structure unit 57 and stacks of the support structure units 57 are arranged or placed in a side-by-side relationship. As shown in FIG. 14, the support body unit 5 may be provided with a bottom surface portion 61 (a lower surface support portion) and a top surface portion 63 (an upper surface support portion), and the saclike membrane 7 may be compressed by the bottom surface portion 61 and the top surface portion 63 upwardly and downwardly. Here, the single support structure unit 57 may be used and adapted to support a water storage tank (refer to a phantom line) on the top surface portion 63 thereof.

Figure 15:
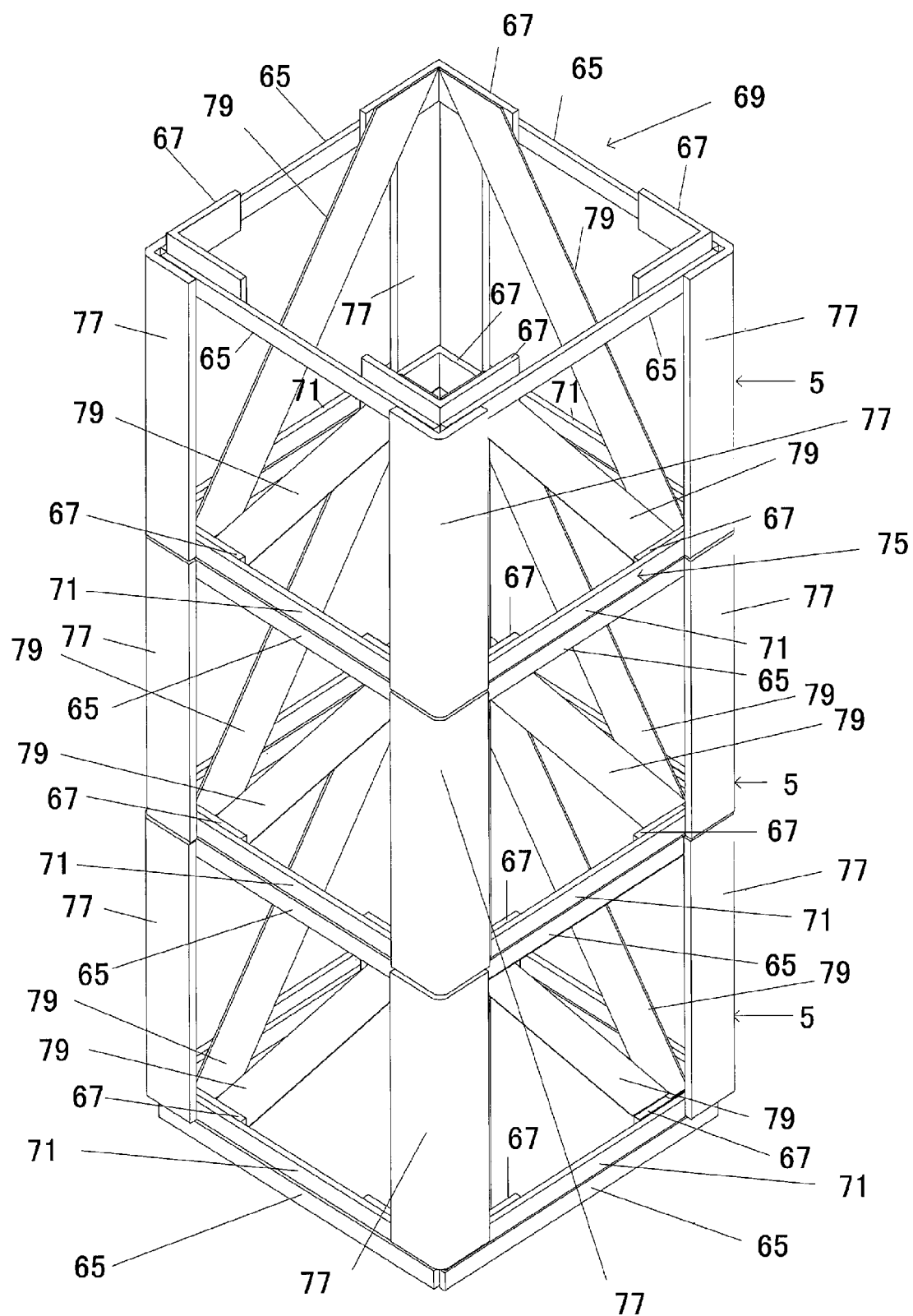
FIG. 15 is a view showing another arrangement of a metallic support body unit having a truss structure.

FIG. 15 is a view showing another arrangement of a metallic support body unit 5 having a truss structure.

The support body unit 5 comprises an upper beam body or beam frame 69 defined by four beams 65 which are connected to one another with L-shaped member 67 in a square shape, a lower beam body or beam frame 75 defined by four beams 71 which are connected to one another with L-shaped member 67 also in the square shape, four columns 77 connecting the upper beam frame 69 and the lower beam frame 75, and bracings 79 each bridging between the L-shaped members 67. The L-shaped member 67 at least positioned on the stacked portion has a size sufficient to connect the lower beam frame 75 of the upper support body unit 5 and the upper beam frame 69 of the lower support body unit 5. Here, four upper winding strips 17 of the saclike membrane 7 are wound and fixed on the upper beams 65, while four lower winding strips 21 of the saclike membrane 7 are would and fixed on the lower beams 71.

Figure 16:
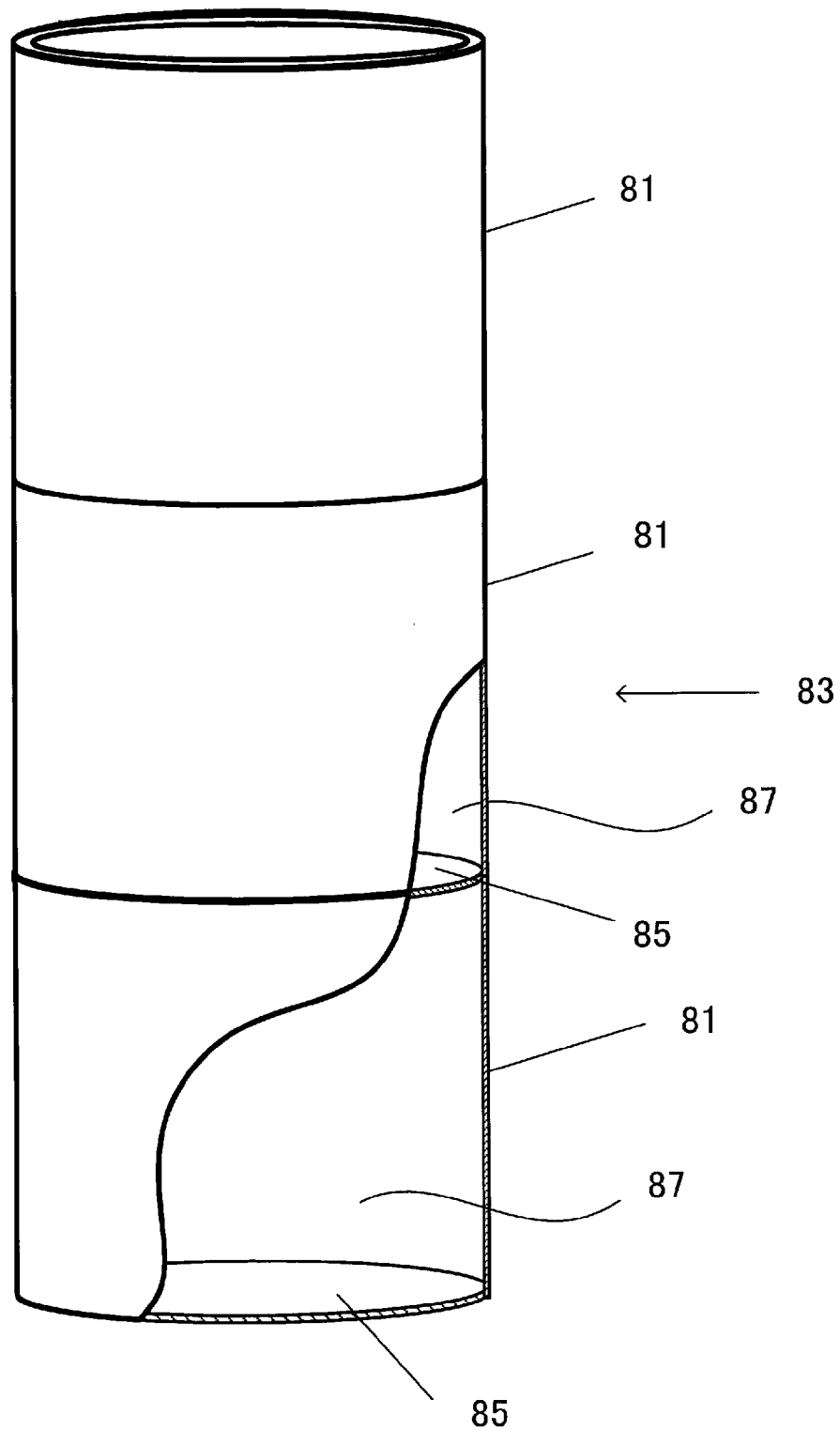
FIG. 16 is a view for explaining another arrangement of the columnar support structure of the building.
Figure 17:
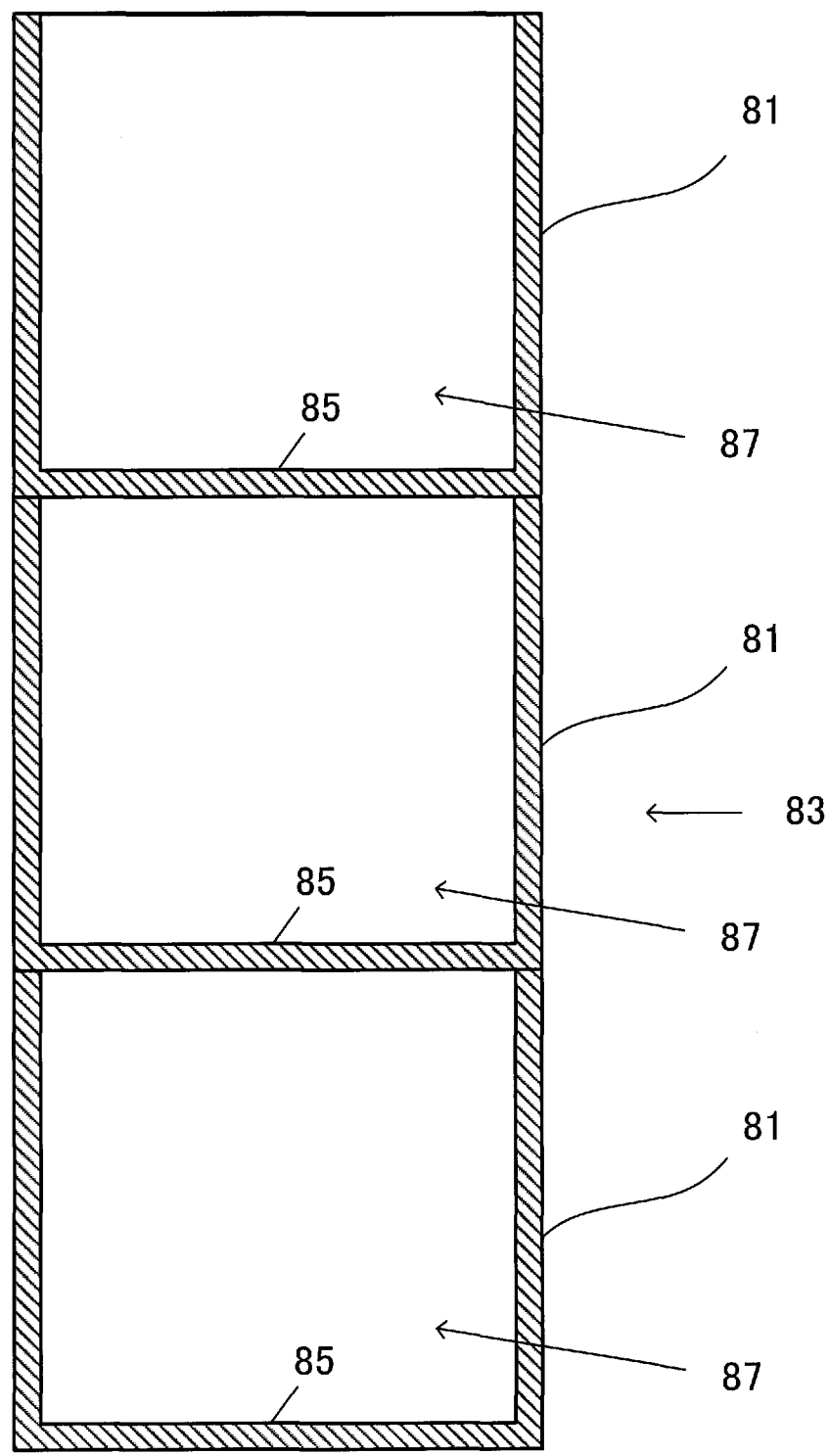
FIG. 17 is a sectional view for explaining another arrangement of the columnar support structure of the building.

FIG. 16 is a view for explaining another arrangement of the columnar support structure of the building 1, and FIG. 17 is a sectional view for explaining another arrangement of the columnar support structure of the building 1.

Figure 18:
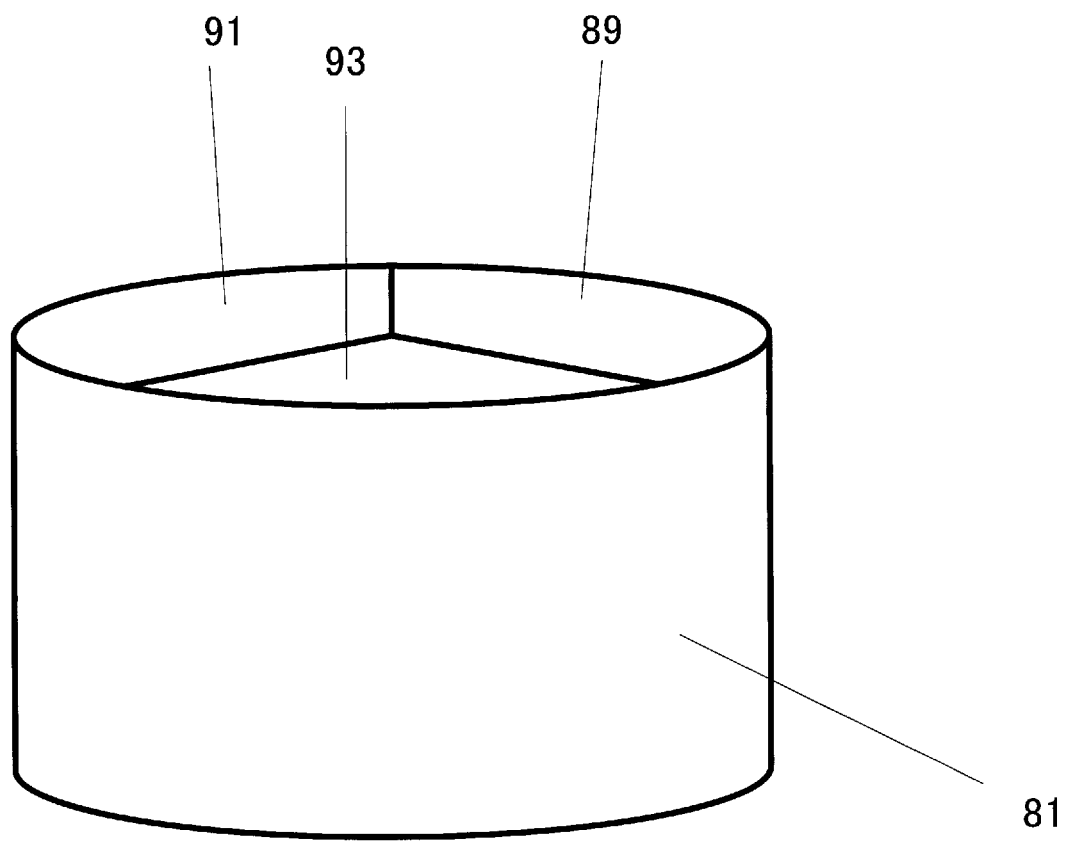
FIG. 18 is a view showing that a plurality of saclike membranes are arranged radially in a cylindrical body.
Figure 19:
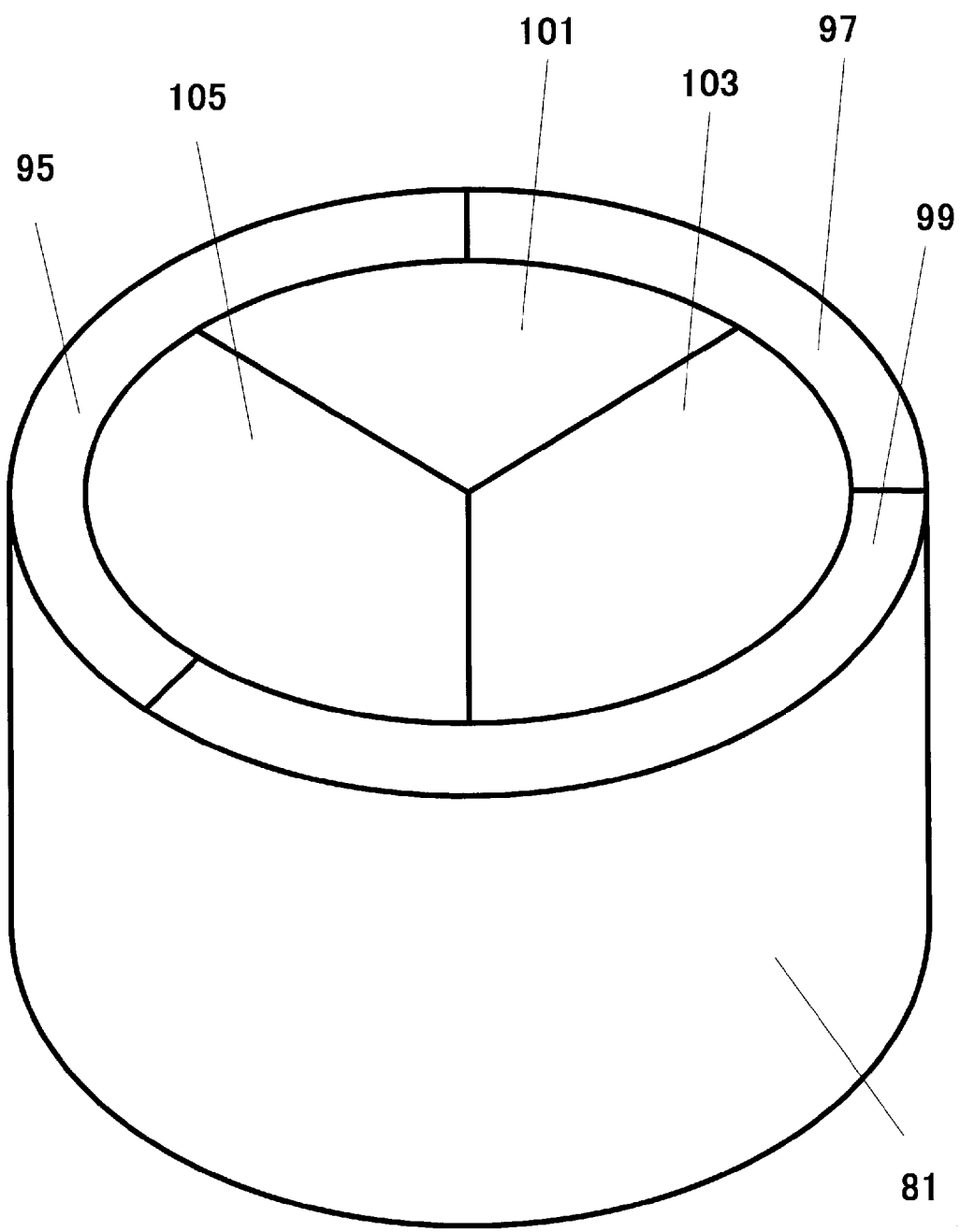
FIG. 19 is a view showing that the plurality of the saclike membranes are arranged radially in the cylindrical body in another manner.

The columnar support structure of the building 1 may have a pipe-shaped support body 83 having a shell structure which is constructed by stacking a cylindrical body 81 on top of another in a direction of a height of the pipe-shaped support body 83 and fixing to one another. Each cylindrical body 81 has a bottomed cylindrical body including a bottom surface portion 85. In the pipe-shaped support body 83, a pressure chamber 87 is provided between the bottom surface portion 85 of the upper cylindrical body 81 and the bottom surface portion 85 of the lower cylindrical body 81. For example, an internal pressure control device 31 is connected to the pressure chamber 87, and a pressure is applied in the pressure chamber 87. Meanwhile, a saclike membrane may be disposed in the cylindrical body 83 and compressed downwardly and upwardly between the bottom surface portion 85 of the upper cylindrical body 81 and the bottom surface portion 85 of the lower cylindrical body 81. Further, as shown in FIGS. 18 and 19, a plurality of the saclike membranes 89, 91, 93, 95, 97, 99, 101, 103, 105 may be radially arranged in the cylindrical body 81. In this arrangement, even if one of the saclike membranes is damaged, the pressurized state may be maintained in the rest of saclike membranes. And, in the arrangement as in FIG. 19, in heating up the saclike membranes, the temperature is raised only in the inner saclike membranes 101, 103 and 105, and not in the outer saclike membranes 95, 97 and 99, thereby the outer saclike membranes 95, 97 and 99 may serve as heat insulating function.

Figure 20:
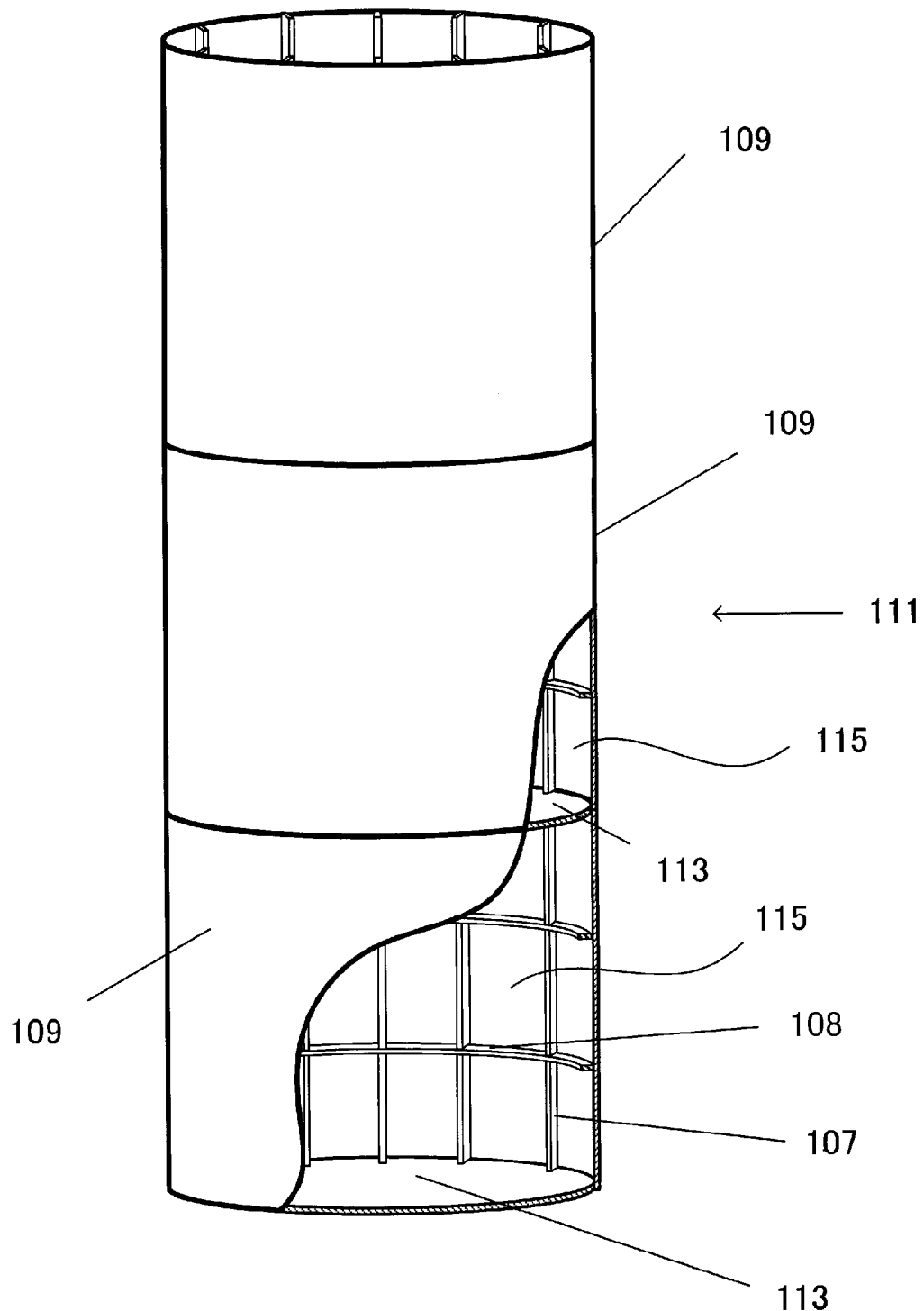
FIG. 20 is a view for explaining yet another arrangement of the columnar support structure of the building.
Figure 21:
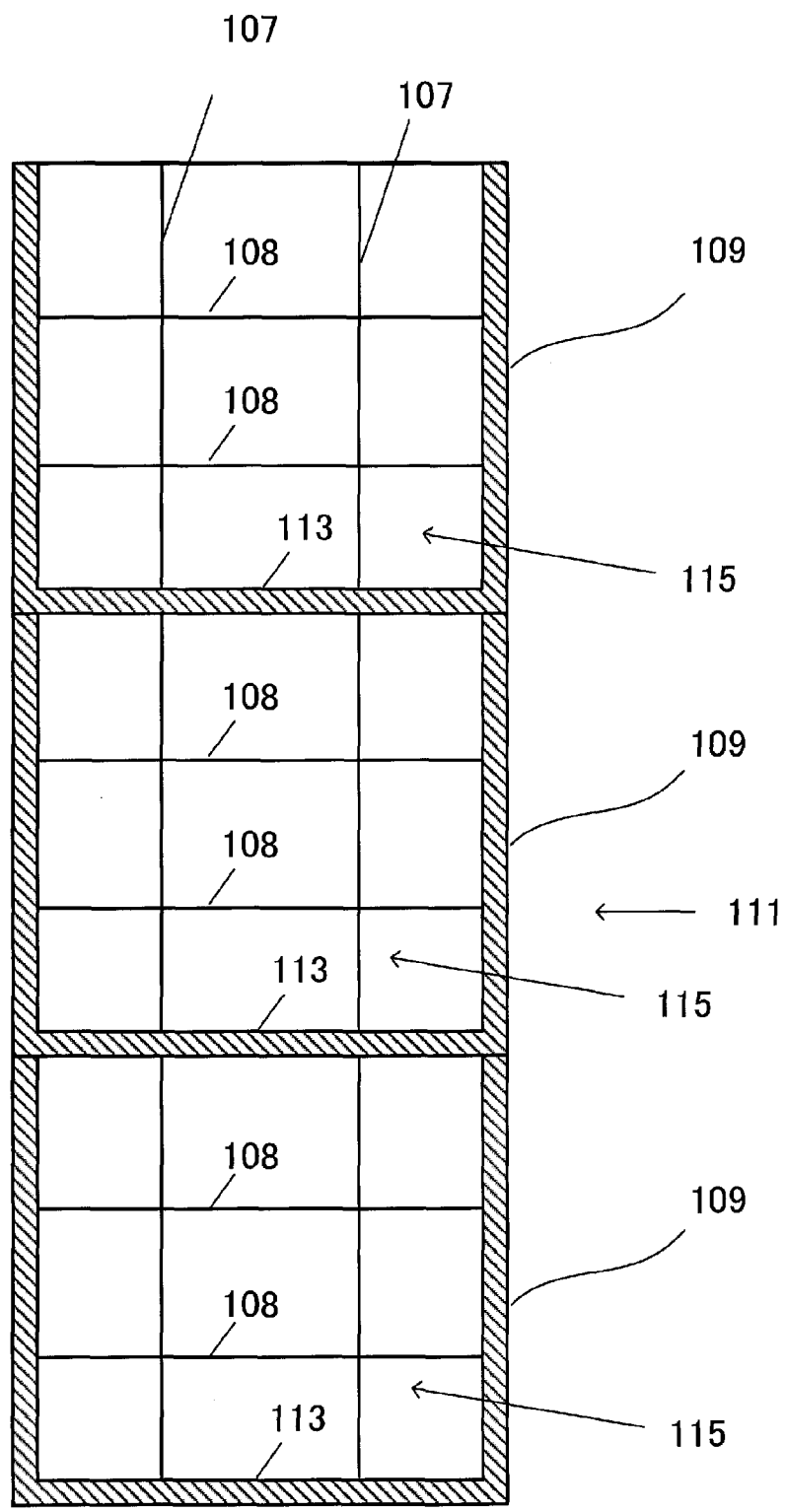
FIG. 21 is a sectional view for explaining yet another arrangement of the columnar support structure of the building.

FIG. 20 is a view for explaining yet another arrangement of the columnar support structure of the building 1, and FIG. 21 is a sectional view for explaining yet another arrangement of the columnar support structure of the building 1.

The columnar support structure of the building 1 may have a pipe-shaped support body 111 having a monocoque structure which is constructed by stacking a cylindrical body 109 on top of another in a direction of a height of the pipe-shaped support body 111 and fixing to one another. The cylindrical body 109 includes an inner surface on which longitudinally running lines 107 and circumferentially running lines 108 are provided. Each cylindrical body 109 has a bottomed cylindrical body including a bottom surface portion 113. In the pipe-shaped support body 111, a pressure chamber 115 is provided between the bottom surface portion 113 of the upper cylindrical body 109 and the bottom surface portion 113 of the lower cylindrical body 109. For example, an internal pressure control device 31 is connected to the pressure chamber 115, and a pressure is applied in the pressure chamber 115.

Figure 22:
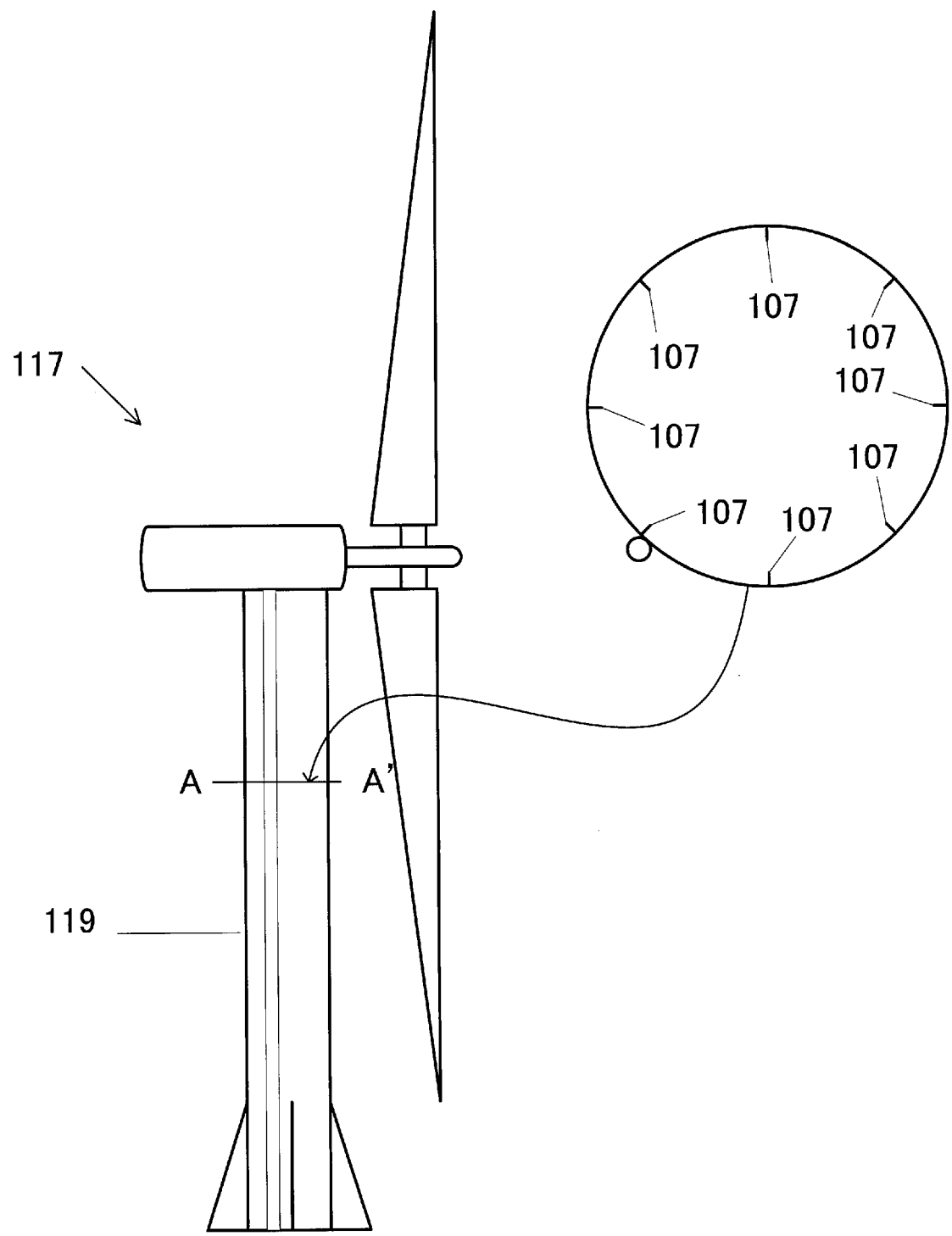
FIG. 22 is a view for explaining a columnar support structure of a different building.

Each of the pipe-shaped structure bodies 83, 111 may be also used in a tower 119 of a wind power tower 117 as shown in FIG. 22.

Figure 23:
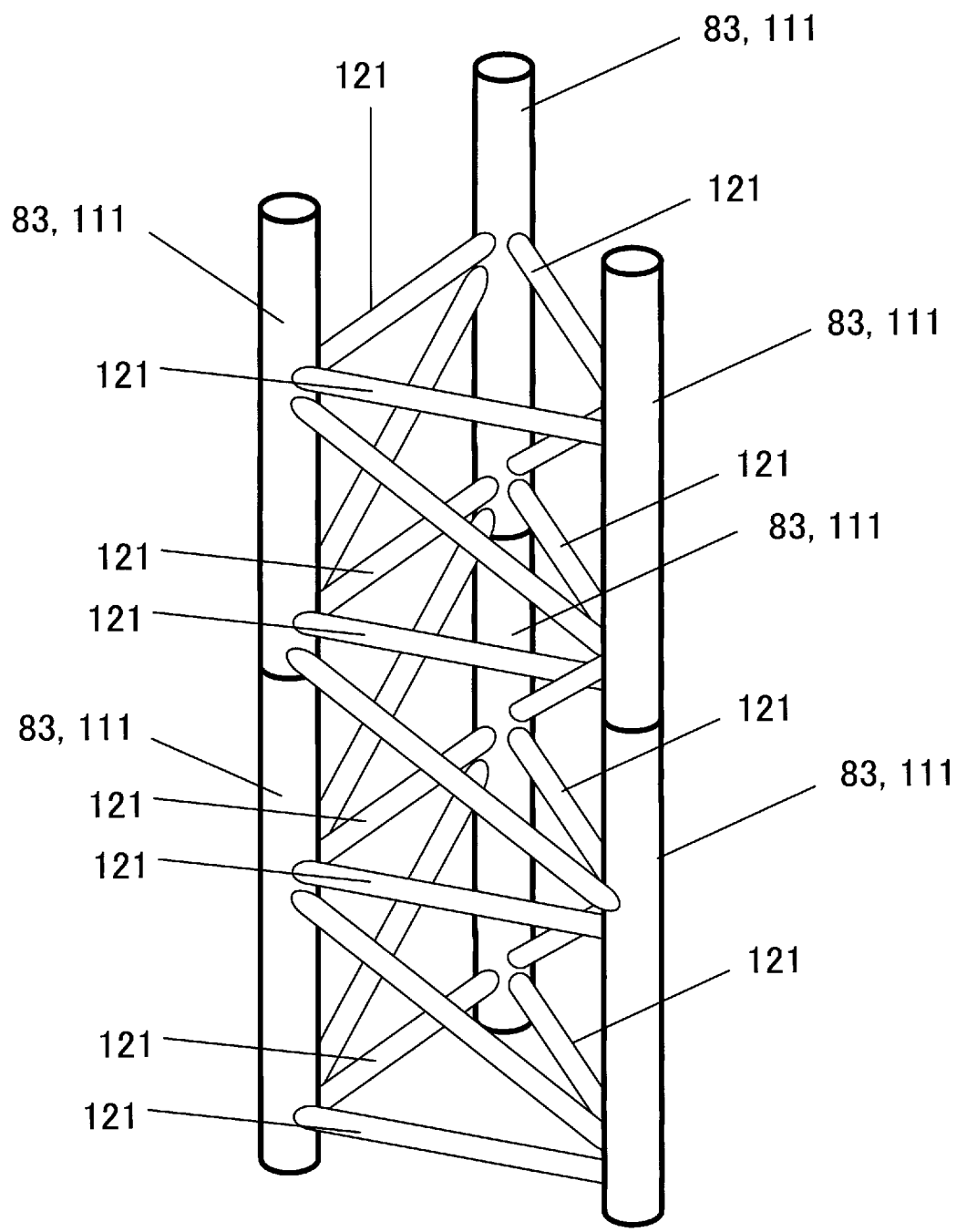
FIG. 23 is a view for explaining a first different arrangement of the columnar support structure of the building.
Figure 24:
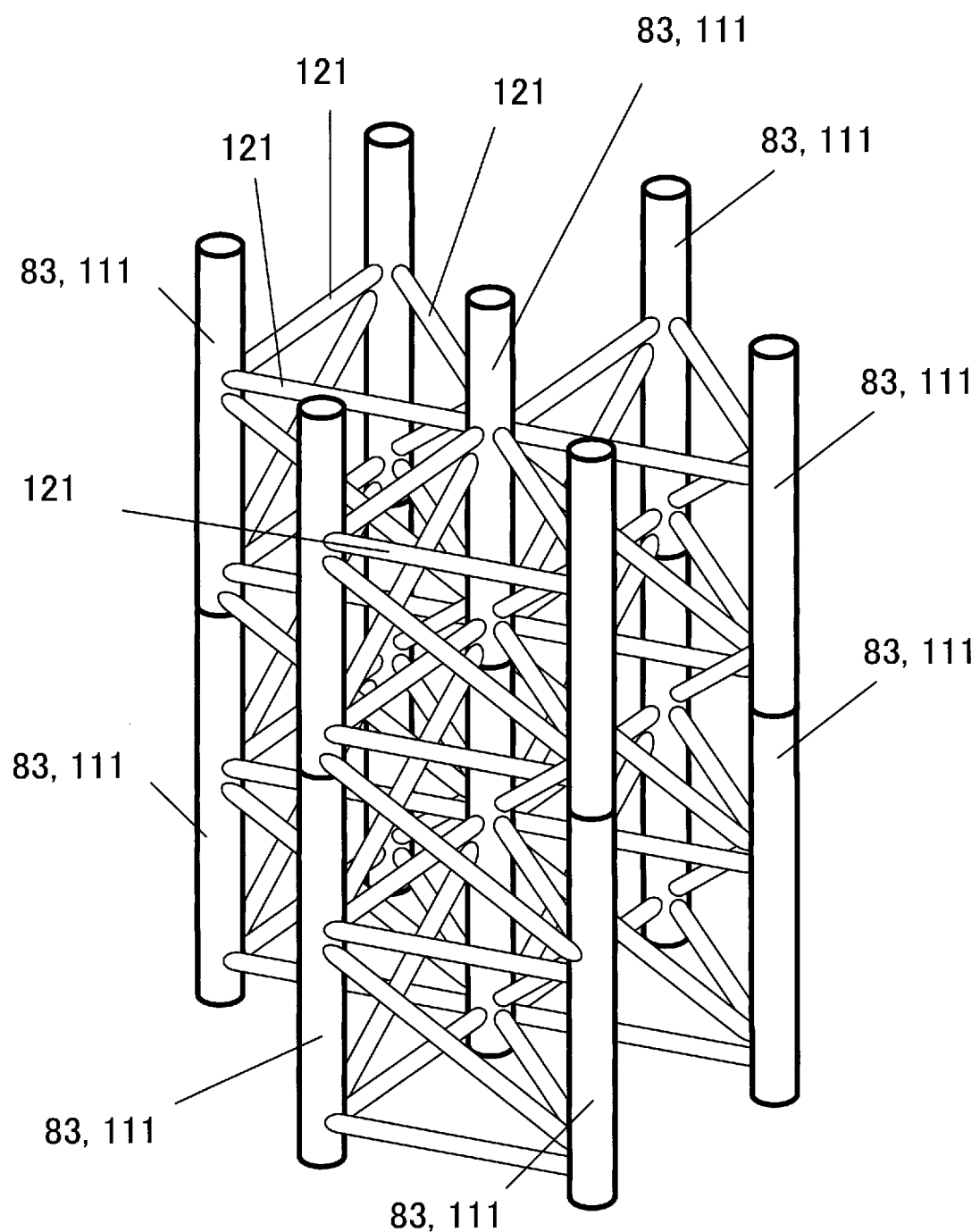
FIG. 24 is a view for explaining a second different arrangement of the columnar support structure of the building.
Figure 25:
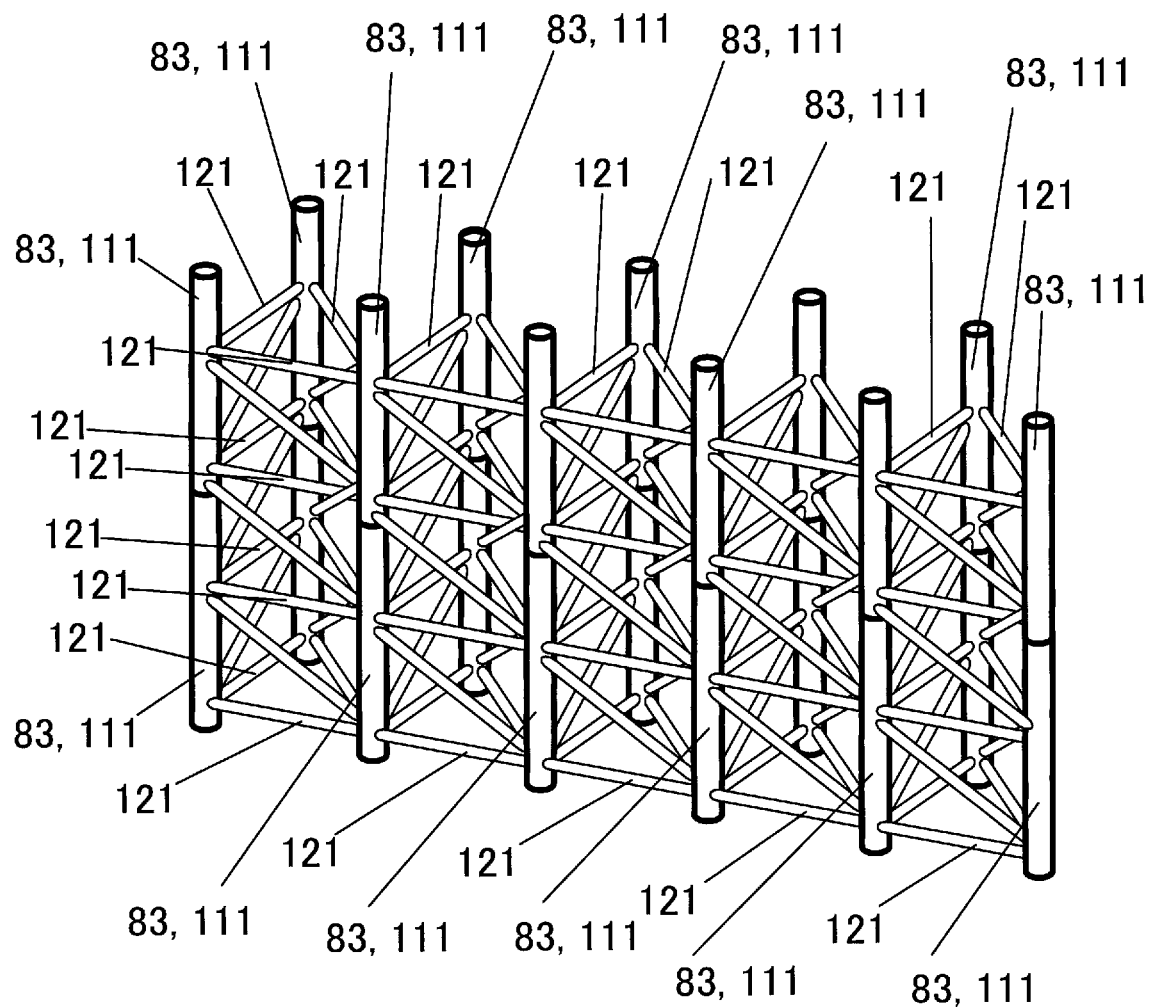
FIG. 25 is a view for explaining a third different arrangement of the columnar support structure of the building.

FIGS. 23 to 25 are views for explaining different (various) arrangements of the columnar support structure of a building 1. In FIG. 23, three pipe-shaped support bodies 83 or 111 are arranged in a triangle, and connected to one another via a connecting member 121 to be used in the columnar support structure of the building 1. In FIG. 24, three sets of the triangular arrangements of the pipe-shaped support bodies 83 or 111 are arranged. In FIG. 25, multiple sets of the triangular arrangements of the pipe-shaped bodies 83 or 111 are arranged. In FIGS. 24 and 25, the pipe-shaped support bodies 83 or 111 are commonly used in the triangular arrangements of the pipe-shaped bodies 83, 111.

What is claimed is:
1. A building support structure comprising:
a rigid support body configured to vertically support a building, the support body having supporting members structured to be statically determinate in any direction, and
a pressurized gas structure provided in the support body, wherein:
the rigidity of the support body is independent from a pressure of the pressurized structure due to the support body not having a foldable joint,
the pressurized gas structure is adapted to reinforce a support strength inherent in the body,
the pressurized gas structure is provided in the support body so as to apply a vertical tension force to the support body to prestress the support body,
the supporting members include a vertical member, an upper horizontal member, and a lower horizontal member, the pressurized gas structure is structurally separated from the vertical member, and the pressurized gas structure has an upper surface outer circumference and a lower surface outer circumference, the upper surface outer circumference is directly connected to an upper surface support portion of the upper horizontal member by a connector, and the lower surface outer circumference is directly connected to a lower surface support portion of the lower horizontal member by the connector.

2. The building support structure as set forth in claim 1, wherein the support body is formed into a cylindrical shape including a partition wall in a vertical position, and the pressurized gas structure being a pressure chamber defined by the partition wall in the support body.

3. The building support structure as set forth in claim 1, wherein the pressurized gas structure is a membrane sack.

4. The building support structure as set forth in claim 3, wherein the membrane sack is connected to the support body under a vertical compression force applied by the support body, whereby the membrane sack applies a vertical preload to the support body.

5. The building support structure as set forth in claim 4,
wherein the membrane sack is compressed between the upper surface support portion and the lower surface support portion of the support body under the vertical compression force applied by the upper surface support portion and the lower surface support portion of the support body.

6. The building support structure as set forth in claim 1, wherein the pressurized gas structure is provided with a pressure sensor configured to detect an internal pressure of the pressurized gas structure and a pressure controller configured to adjust the internal pressure to maintain the support body as prestressed.

7. A building structure comprising:
a rigid support body configured to vertically support a building, the support body having supporting members structured to be statically determinate in any direction, and
a pressurized gas structure provided in the support body that is configured to apply a vertical tension force to the support body to prestress the support body, wherein:
the rigidity of the support body is independent from a pressure of the pressurized gas structure due to the support body not having a foldable joint,
the pressurized gas structure is adapted to reinforce a support strength inherent in the support body,
the pressurized gas structure is sectioned or divided into a plurality of pressurized gas structure portions, each of the pressurized gas structure portions being adapted to apply a vertical tension force to the support body,
the plurality of the pressurized gas structure portions are arranged sequentially so as to extend in a direction of a height of the support body,
the supporting members include a vertical member, an upper horizontal member, and a lower horizontal member,
the pressurized gas structure is structurally separated from the vertical member, and
the pressurized gas structure has an upper surface outer circumference and a lower surface outer circumference, the upper surface outer circumference is directly connected to an upper surface support portion of the upper horizontal member by a connector, and the lower surface outer circumference is directly connected to a lower surface support portion of the lower horizontal member by the connector.

8. The building support structure as set forth in claim 7, wherein the support body is formed into a cylindrical shape including a partition wall in a vertical position, and at least one of the pressurized gas structure portions is a pressure chamber defined by the partition wall in the support body.

9. The building support structure as set forth in claim 7;
wherein the pressurized gas structure portion is a membrane sack; and
wherein the membrane sack is connected to the support body under a vertical compression force applied by the support body, thereby the membrane sack applies a vertical preload to the support body.

10. The building support structure as set forth in claim 9, wherein the membrane sack is compressed between the upper surface support portion and the lower surface support portion of the support body under the vertical compression force applied by the upper surface support portion and the lower surface support portion of the support body.

11. The building support structure as set forth in claim 7, wherein an internal pressure of a said pressurized gas structure portion which is positioned lower is set higher than an internal pressure of a said pressurized gas structure portion which is positioned higher.

12. The building support structure as set forth in claim 7, wherein the lower a said pressurized gas structure portion is positioned, the higher the internal pressure of the said pressurized gas structure portion is set.

13. The building support structure as set forth in claim 7, wherein at least one of the pressurized gas structure portions is provided with a pressure sensor configured to detect an internal pressure of the pressurized gas structure and a pressure controller configured to adjust the internal pressure to maintain the support body as prestressed.

14. A building support structure comprising;
a plurality of support structure units,
wherein each of the support structure units has (1) a rigid support body unit that is configured to vertically support a building and that has supporting members structured to be statically determinate in any direction, and (2) a pressurized gas structure portion provided in the support body unit so as to apply a vertical tension force to the support body unit to prestress the support body unit, wherein:
the rigidity of the support body unit is independent from a pressure of the pressurized gas structure due to the support body unit not having a foldable joint, the pressurized gas structure being adapted to reinforce a support strength inherent in the support body unit,
the plurality of the support structure units are arranged sequentially so as to extend in a direction of a height of the support structure unit,
the supporting members include a vertical member, an upper horizontal member, and a lower horizontal member,
the pressurized gas structure is structurally separated from the vertical member, and
the pressurized gas structure has an upper surface outer circumference and a lower surface outer circumference, the upper surface outer circumference is directly connected to an upper surface support portion of the upper horizontal member by a connector, and the lower surface outer circumference is directly connected to a lower surface support portion of the lower horizontal member by a connector.

15. The building support structure as set forth in claim 14, wherein the support body unit is formed into a cylindrical shape including a partition wall in a vertical position, and the pressurized gas structure portion is a pressure chamber defined by the partition wall in the support body unit.

16. The building support structure as set forth in claim 14, wherein the pressurized gas structure portion is a membrane sack.

17. The building support structure as set forth in claim 16, wherein the membrane sack is connected to the support body unit under a vertical compression force applied by the support body unit, whereby the membrane sack applies a vertical preload to the support body unit.

18. The building support structure as set forth in claim 17, wherein the membrane sack is compressed between the upper surface support portion and the lower surface support portion of the support body unit under the vertical compression forces applied by the upper surface support portion and the lower surface support portion of the support body unit.

19. The building support structure as set forth in claim 14, wherein an internal pressure of the pressurized gas structure portion of a said support structure unit which is positioned lower is set higher than an internal pressure of the pressurized gas structure portion of a said support structure unit which is positioned higher.

20. The building support structure as set forth in claim 14, wherein the lower a said support structure unit is positioned, the higher the internal pressure of the pressurized gas structure portion of the a said support structure unit is set.

21. The building support structure as set forth in claim 14, wherein the pressurized gas structure portion is provided with a pressure sensor configured to detect an internal pressure of the pressurized gas structure portion and a pressure controller configured to adjust the internal pressure to maintain the support body as prestressed.

* * * * *